United States Patent [19]

Domarenok et al.

[11] 4,403,251
[45] Sep. 6, 1983

[54] THERMOVISION PYROMETER FOR REMOTE MEASUREMENT OF TEMPERATURE OF AN OBJECT

[76] Inventors: Nikolai I. Domarenok, ulitsa Skriganova, 5, kv. 49; Anatoly P. Dostanko, Leninsky prospekt, 143, korpus 1, kv. 14; Igor G. Moroz, ulitsa V.Khoruzhei, 42, kv. 18, all of Minsk; Alexei S. Kanevsky, ploschad Lenina, 2/1, kv. 22, Kievskaya oblast, Belaya Tserkov; Vsevolod A. Vasiliev, ulitsa Uralskaya, 7, kv. 12, Minsk, all of U.S.S.R.

[21] Appl. No.: 274,506

[22] Filed: Jun. 17, 1981

[51] Int. Cl.[3] .............................................. H04N 7/18
[52] U.S. Cl. .................................. 358/107; 358/413; 364/415; 364/557
[58] Field of Search ............... 358/113, 107; 250/334, 250/330; 364/414, 415, 557

[56] References Cited

U.S. PATENT DOCUMENTS

| | | | |
|---|---|---|---|
| 3,798,366 | 3/1974 | Hunt et al. | 358/113 |
| 3,806,633 | 4/1974 | Coleman | 358/113 |
| 3,902,011 | 8/1975 | Pieters et al. | |
| 3,909,521 | 9/1975 | Hunt et al. | 358/113 |
| 4,218,707 | 8/1980 | Reed et al. | 358/113 |

FOREIGN PATENT DOCUMENTS

| | | |
|---|---|---|
| 1473258 | 11/1972 | Fed. Rep. of Germany . |
| 303812 | 9/1968 | Sweden . |
| 1357940 | 6/1974 | United Kingdom . |
| 303812 | 5/1971 | U.S.S.R. . |
| 409088 | 7/1971 | U.S.S.R. . |

OTHER PUBLICATIONS

Direct Comparison Method; 1979; pp. 122-131; translation from Russian.

Primary Examiner—Robert L. Griffin
Assistant Examiner—Edward L. Coles
Attorney, Agent, or Firm—Fleit, Jacobson & Cohn

[57] ABSTRACT

A thermovision pyrometer for measuring the temperature of an object t.v. camera for focusing thermal radiation, an optical switch for alternately passing at least two spectral components of the radiation, a detector for sensing each spectral component and for generating respective video signals proportional to the density of the spectral components. The synchronizing signal of the t.v. camera controls the optical switch. The pyrometer also includes a gating circuit for generating a gating marker signal which control the position of the point of observation. The gating circuit also is controlled by the t.v. synchronizing signal. Further, the pyrometer includes a sampling circuit for sampling and measuring the amplitudes of the video signals from both the t.v. camera and the gating circuit, as well as circuitry for determining the temperature of the object based upon the ratio of the flux densities of the respective spectral components detected at the point of observation. This ratio information is transferred to a computer via an information signal transfer switch which switches the information path between the gating circuit and the raster scanning circuit to drive a character generator which displays on a t.v. monitor temperature information relative to an object under investigation. The result achieved is to minimize temperature measurement error due to nonuniformity in surface emissivity of the object or raster sensitivity of the vidicon tube used in the t.v. camera.

8 Claims, 15 Drawing Figures

THERMOVISION PYROMETER FOR REMOTE MEASUREMENT OF TEMPERATURE OF AN OBJECT

FIELD OF THE INVENTION

The present invention relates to arrangements for measuring and controlling the temperatures of objects as indicated by their thermal radiation, and more particularly it concerns thermovision pyrometers for remote measurement of the object temperature.

BACKGROUND OF THE INVENTION

The present invention can be used in systems for monitoring and controlling the temperature of thermal processes in metallurgy, mechanical engineering industry, semiconductor technology, microelectronics, thermochemistry and glass production. An example of this is the use of the present invention for temperature monitoring of epitaxial growth of semiconductor layers in microelectronics, and for controlling thermal characteristics of local heating of rolled sheets in metallurgy and machine industry.

In all these arrangements, a problem arises both of evaluating the true temperature of an object at a particular selected point on its surface and of obtaining a true temperature profile over the entire surface of the object, taking into account non-uniformity of this surface as regards its emissivity (considering film structure of varying thickness, oxide films, scale, heterogeneous materials, etc. present on the surface of the object) and variation in sensitivity over the target area of camera tubes and television cameras. Another difficulty with such known arrangements resides in the fact that their readings, i.e. the temperature measurement results, are dependent on the distance between the object under investigation and the television camera, upon the absorbing properties of the intervening medium therebetween (different windows, water jackets, metal grids, dustiness of the gaseous medium, etc.), and upon the parameters of the video amplifier employed (i.e. its amplitude-frequency response).

Known in the prior art is an arrangement for measuring the object temperature (cf. U.S.S.R. Inventor's Certificate No. 409088) comprising an optical system through which radiation from an object is projected onto the photocathode of a television camera. The video signal generated by the TV-camera is applied to the input of a television receiver which delivers frame and line synchronizing pulses to a means for sampling a selected line video signal. As the selected line number is counted off, its video signal is amplified and applied to the additional vertical deflection coils or plates of the picture tube in the television receiver, the brightness level of the beam being increased for the period of line duration. A local temperature distribution pattern (or temperature profile) of an object is continuously displayed on the screen together with the image of the object following the points lying on the dark path of the selected line.

This arrangement provides visual information on the temperature profile only along a particular line on an object.

This arrangement, however, tends to introduce a considerable error on account of the subjective character of reading the temperature of the object by its temperature profile slot and owing to low accuracy of the devices shaping this temperature profile.

In another known arrangement for measuring temperature of a heated object (cf. FRG Patent No 1473258) comprising a TV-camera connected, via amplifying stages, to a colour television receiver, a signal is generated in the amplifying stages and a particular colour assigned to individual points of the object image on the screen depending on the temperature of the respective points on the surface of the object, thus allowing observation of isothermal lines and areas distributed over the object surface. A quantitative measure of the isotherm temperatures is given by the images of reference radiation sources of known temperature exhibited on the screen of the TV-receiver. By comparing the colours of the images of the reference source and the object under investigation, the temperature of the latter is obtained.

The principle of generating colour signals of the thermal image in this arrangement is based on amplitude discrimination of the video signal generated by the television camera which suffers from a disadvantage residing in variation of sensitivity over the field of the image being generated, which entails appreciable errors when this arrangement is used for measuring the temperature of the object under investigation (even if the object does not exhibit a non-uniform emissivity feature).

There is known a system for reducing the effect of background shading introduced by variation in sensitivity over the target area of a camera tube (cf. U.S. Pat. No. 3,902,011) comprising a TV-camera and a video monitor connected through a video amplifier, the signal thereof being corrected under control of an electronic computer comprising a multiple location store for storing the shading correction signal, an interpolator means for interpolation of storage correction values, a device for automatically storing the correction signal in locations of the store for a period of several scanning frames.

This prior art system allows a true and reliable reproduction of uniformly illuminated (i.e. uniformly heated) images of the object on the video monitor screen.

In order that the system be programmed, i.e. information concerning the desired correction signal be inserted into the store, a reference source of a perfectly uniform temperature field is required. But the provision of a reference source with a sufficiently large area of radiating surface and a constantly uniform distribution of emmisivity thereover presents certain difficulties. And consequently, the overall accuracy of temperature profile analysis is affected. Mover, even the systems ensuring most satisfactory visual images of thermal or temperature profiles fail to provide a sufficiently accurate quantitative estimation of the temperature drop in at least two points of the profile due to the subjective character of this estimation.

Known in the art is an arrangement for measuring the temperature difference between the points of an object displayed on the screen of the cathode-ray tube (cf. U.S.S.R. Patent No. 303812) comprising a camera generating a video signal, a change in intensity thereof corresponding to a change in point temperatures of the object under investigation, a video amplifier which amplifies the video signal, a means for controlling brightness of the cathode-ray beam, a manual adjustment device coupled to the brightness control means. The manual adjustment device serves to sequentially fix the brightness level of any two visually compared image points of the object under investigation. As a result, a dial mechanically coupled to the brightness control knob allows a direct evaluation of the temperature difference between two selected points on an object.

This known arrangement, however, lacks accuracy of evaluating the object temperature due to the subjective character of this evaluation. It exhibits a poor reliability of mechanical devices and fails to provide a sufficient accuracy in locating the object points to be monitored.

Known in the art is a radiation monitoring system (U.K. Patent No. 1,357,940) comprising an optical system for focusing thermal radiation emitted by an object under investigation, a reference lamp with an associated prism arrangement employed for calibration of the system, a TV-camera responsive to thermal radiation from the object and the reference lamp to produce a video signal proportional to their thermal radiation density, a television monitor with its input connected to the output of the TV-camera, a means for generating the gating marker, the input thereof being connected to the synchronizing output of the TV-camera and the output connected to the first information input of the television monitor, a means for sampling and measuring the video signal amplitude with its signal input connected to the output of the TV-camera and its control input connected to the output of the gating marker generating means, a character generator with its synchronizing input connected to the synchronizing output of the TV-camera and its output connected to the second information input of the TV-monitor, and a computer with its output connected to the input of the character generator and the input electrically connected to the output of the means for sampling and measuring the video signal amplitude.

This system provides an objective temperature measurement of the object under investigation at any point on its surface specially indicated by a movable dot, or marker, on the screen of the TV-monitor.

This system, however, lacks accuracy in measuring the temperatures at different points on the surface of the object under investigation, the images of which are positioned at different points of the television raster, this inaccuracy being due to the following factors: variations in sensitivity at different points on the target of the TV-camera tube (as much as 15%) and inadequate adjustment for these variations by means of the reference lamp with the associated prism arrangement; variations in emissivity of the surface of the object under investigation which cannot be adjusted by the reference lamp, its filament ultimately exhibiting a varying emissivity; the resulting measurements are influenced by the distance from the object under investigation and the TV-camera, which necessitates recalibration of the system or correction of its measurements in case the distance is changed; the resulting measurements are influenced by the absorbing properties of the intervening medium between the object and the TV-camera; the resulting measurements are influenced by the parameters of the optical system (i.e. aperture ratio of the lens employed and its focal distance), which necessitates recalibration of the system or appropriate correction provided therein in case the optical system is changed; the resulting measurements obtained by means of the system are influenced by the parameters of the TV-camera video amplifier (i.e. its amplitude-frequency response) thus preventing a true and reliable measurement of the temperature of objects which are small in size when displayed on the screen of the TV-monitor.

SUMMARY OF THE INVENTION

It is an object of the present invention to provide a thermovision pyrometer for remote temperature measurement ensuring an improved accuracy of measuring the temperature of the object under investigation.

It is another object of the invention to eliminate the effect of the emissivity of the object under investigation on the temperature measurement result.

It is still another object of the invention to simplify the arrangement by eliminating the effect of variation in sensitivity over the target area of the TV-camera tube on the result of measuring the point temperature and the temperature profile of the surface of the object under investigation.

It is yet another object of the invention to eliminate the influence of the absorbing properties of the intervening medium between the object under investigation and the TV-camera of the thermovision pyrometer on its temperature measurement accuracy.

It is another object of the invention to allow measurement of the temperature of different objects placed at different distances, without the necessity to recalibrate the thermovision pyrometer.

It is another object of the invention to allow measurement of the object temperature by means of a thermovision pyrometer with replaceable lenses possessing different parameters, without the necessity to recalibrate the thermovision pyrometer employed.

It is another object of the invention to increase geometrical resolution of the thermovision pyrometer by virtue of eliminating the influence of the TV-camera video amplifier parameters on the temperature masurement results.

It is a further object of the invention to provide a better accuracy of measuring the temperature difference between two points of the object being monitored.

With these and other objects in view, in a thermovision pyrometer for remote measurement of the temperature of an object, comprising an optical system for focusing the thermal radiation emitted by the object under investigation, a television camera sensing the thermal radiation flux to produce a video signal proportional to the density of the thermal radiation, a television monitor with its input connected to the output of the television camera, a means for generating the gating marker for the video signal proportional to the density of the thermal radiation flux from the object under investigation, the input thereof being connected to the synchronizing output of the television camera, and the first output being connected to the first information input of the television monitor, a means for sampling and measuring the amplitude of the video signal proportional to the density of the thermal radiation flux from the object under investigation, the signal input thereof being connected to the output of the television camera, the control input being connected to the first output of the gating marker generating means, a character generator with its synchronizing input connected to the synchronizing output of the television camera and its output connected to the second information input of the television monitor, and a computer, the outputs thereof being connected to the inputs of the character generator, according to the invention, there are further provided an optical filtration switching arrangement for sequentially passing the spectral components of the thermal radiation flux from the object under investigation focused by the optical system, lying in at least two different regions of the spectrum, the input of the arrangement being connected to the synchronizing output of the television camera, and an information signal switching means, its information input being connected to the information output of the means for sampling and measuring the video signal amplitude, the first control input being connected to the output of the optical filtration switching arrangement, the second control input being connected to the second output of the gating marker generating means, the third and fourth control inputs being connected to the first and second outputs, respectively, of the means for sampling and measuring the video signal amplitude, and the first and second outputs being connected to the first and second inputs, respectively, of the computer.

Insertion of the optical filtration switching arrangement into the circuit of the thermovision pyrometer enables an inherent radiation flux from an object of at least two spectral compositions, i.e. in two regions of the spectrum with a different wavelength, to be sequentially directed to the photosensitive target of the television camera tube, while insertion of the information signal switching means allows the information about the densities of the respective spectral components of the radiation flux from the object to be separately extracted and applied to the computer for subsequent processing, in order to obtain thereby the colour, or true, temperature of the object, thus resulting in a better accuracy of temperature measurement.

The optical filtration switching arrangement should preferably comprise a carrier for at least two optical filters, a means for controlling the displacement of the carrier in a plane parallel to the optical input of the TV camera, the input thereof being connected to the synchronizing output of the TV camera, and a means for tracking the speed of displacement of the optical filter carrier, its output being connected to the first control input of the information signal switching means.

The provision of the carrier for at least two optical filters permits the respective spectral components of the thermal radiation flux from the object under investigation to be passed to the photosensitive target area of the TV camera tube. The provision of the means for controlling the displacement of the optical filter carrier allows displacement of the carrier relative to the photosensitive target of the TV camera tube in synchronism with the frame scanning frequency of the TV camera.

The provision of the means for tracking the speed of displacement of the optical filter carrier makes it possible to obtain information about the phase characteristics of the optical switching process for switching the spectral components of the radiation flux from the object, and consequently to provide automatic control of the carrier frame displacement process and synchronous operation of the information signal switching means.

It is preferable that the carrier for at least two optical filters comprise a frame provided with a pair of tips of ferromagnetic material positioned at the opposite end faces of the frame on a line parallel to the line passing through the centres of the optical filters, a pair of electromagnets interacting each with the respective ferromagnetic tip of the frame, and two opto-electronic couplings intended for locating the position of the frame; it is also preferred that the means for tracking the speed of displacement of the optical filter carrier comprise a first amplifier and a second amplifier, their inputs being connected each with the respective optoelectronic coupling, and a coincidence circuit, the first input thereof being connected to the output of the first amplifier, the second input being connected to the output of the second amplifier, and the output thereof being connected to the first control input of the information signal switching means; also the means for controlling the displacement of the optical filter carrier should preferably comprise a phase detector with its first input connected to the output of the coincidence circuit, the second input connected to the synchronizing output of the TV camera, a power source with its input connected to the output of the phase detector, and an electronic switch, its signal input being connected to the output of the power source, its control input being connected to the synchronizing output of the TV camera, and the first and second outputs being connected to the inputs of the respective electromagnets.

This realization of the optical filter carrier has caused the possible embodiments of the optical filtration arrangement to be substantially simplified, requiring for its control only phase adjustment of the process of displacing the optical filter carrier frame. Two amplifiers employed for amplifying the signals from the photosensors and a coincidence circuit provided in the arrangement for tracking the speed of displacement of the optical filter carrier frame act to simplify the process of generating the signal indicating the position of the carrier frame with respect to the photosensitive target of the TV camera tube and its speed of displacement.

The provision of a phase detector, a power source, and an electronic switch in the control unit allows, in addition to generating the control pulses necessary for operation of the optical filter carrier, generation of a signal adjusting the speed and phase of displacement of the optical filter carrier frame, resulting in phase stabilization of the optical switching process for the spectral components of the radiation flux.

It is expedient that the information signal switching means comprise a flip-flop with its input connected to the output of the optical filtration switching arrangement, a first coincidence circuit, its first input being connected to the second output of the means for sampling and measuring the video signal amplitude, the second input being connected to the first output of the flip-flop, a second coincidence circuit, its first input being connected to the second output of the means for sampling and measuring the video signal amplitude, and its second input being connected to the second output of the flip-flop, a first memory unit, its information input being connected to the information output of the means for sampling and measuring the video signal amplitude, its control input being connected to the output of the first coincidence circuit, and its output being connected to the first input of the computer, a second memory unit, its information input being connected to the information output of the means for sampling and measuring the video signal amplitude, its control input being connected to the output of the second coincidence circuit, and its output being connected to the second input of the computer, a differentiating stage, the input thereof being connected to the second output of the gating marker generating means, and an electronic switch, its control input being connected to the output of the differentiating stage, its signal input being connected to the first output of the video signal amplitude sampling and measuring means, and its output being connected to ground.

The flip-flop, the coincidence circuits, the memory units, the differentiating stage, and the electronic switch employed in the information signal switching means provide for time division of the process of measuring the video signal amplitudes corresponding to different spectral components of the radiation flux from the object under investigation and ensures an improved accuracy in measuring the video signal amplitude and consequently results in a better accuracy of temperature measurement.

It is preferable that the thermovision pyrometer further comprise a means for generating the gating marker for the video signal proportional to the density of the reference radiation flux, its first input being connected to the synchronizing output of the television camera, its second input being connected to the third output of the means for generating the gating marker for the video signal proportional to the density of the thermal radiation flux from the object under investigation, and its output being connected to the third information input of the television monitor, a means for sampling and measuring the amplitude of the video signal proportional to the density of the reference radiation flux, its first control input being connected to the output of the means for generating the gating marker for the video signal proportional to the density of the reference radiation flux, its second and third control inputs being connected to the third and fourth outputs, respectively, of the information signal switching means, a logarithmic division unit, its first and second inputs being connected to the first and second outputs, respectively, of the means for sampling and measuring the amplitude of the video signal proportional to the density of the reference radiation flux and a video signal clamping circuit with its control input connected to the output of the logarithmic division unit, its signal input connected to the output of the television camera, and its output connected to the signal inputs of the means for sampling and measuring the amplitude of the video signal proportional to the density of the reference radiation flux and the means for sampling and measuring the amplitude of the video signal proportional to the density of the thermal radiation flux from the object under investigation.

The insertion of the means for generating the gating marker for the video signal proportional to the density of the reference radiation flux, of the means for sampling and measuring the amplitude of the video signal proportional to the density of the reference radiation flux, and the video signal clamping circuit with a signal proportional to the temperature of the reference radiation source applied to the control input thereof, permits 'clamping' the amplitude reference point of the video signal corresponding to the image of the object under investigation to the value of the video signal corresponding to the image of the reference radiation source, i.e. it provides stabilization of the temperature reference point resulting in a better accuracy of temperature measurement.

It is preferable that the thermovision pyrometer comprise a second means for generating the gating marker for the video signal proportional to the density of the thermal radiation flux from the object under investigation, its input being connected to the synchronizing output of the television camera, its first output being connected to the third information input of the television monitor, its second output being connected to the fifth control input of the information signal switching means, the clock input of one gating marker generating means being connected to the clock output of the other gating marker generating means, an additional means for sampling and measuring the amplitude of the video signal proportional to the density of the thermal radiation flux from the object under investigation, its control input being connected to the first output of the additional means for generating the gating marker, its signal input being connected to the output of the television camera, its information output being connected to the second information input of the information signal switching means, its first and second outputs being connected to the sixth and seventh control inputs, respectively, of the information signal switching means, the third and fourth outputs of the information signal switching means being connected to the third and fourth inputs, respectively, of the computer.

The insertion of the second gating marker generating means and the second video signal amplitude sampling and measuring means into the thermovision pyrometer circuit allows monitoring of the amplitude of the video signal corresponding to the second point on the thermovision image of the object, ensuring in turn an improved accuracy of measuring the temperature difference between two points being monitored.

It is preferable that the thermovision pyrometer comprise an additional means for generating the gating marker for the video signal proportional to the density of the thermal radiation flux from the object under investigation, its input being connected to the synchronizing output of the television camera, its output being connected to the third information input of the television monitor, the clock input of one gating marker generating means being connected to the clock output of the other gating marker generating means, an additional means for sampling and measuring the amplitude of the video signal proportional to the density of the thermal radiation flux from the object under investigation, its first control input being connected to the output of the additional gating marker generating means, its second and third control inputs being connected to the third and fourth outputs, respectively, of the information signal switching means, its signal input being connected to the output of the television camera, an additional switching unit, its first and second control inputs being connected to the third and fourth outputs, respectively, of the information signal switching means, its signal input being connected to the first output of the video signal amplitude sampling and measuring means, a first multiplication unit with its first input connected to the first output of the additional video signal amplitude sampling and measuring means, and its second input connected to the first output of the additional switching unit, a second multiplication unit with its first input connected to the second output of the additional switching unit and its second input connected to the second output of the additional video signal amplitude sampling and measuring means, a comparison circuit, its first input being connected to the output of the first multiplication unit, and its second input being connected to the output of the second multiplication unit, and a unit for controlling the temperature of the object under investigation with its input connected to the output of the comparison circuit.

The insertion into the circuit of the thermovision pyrometer of the additional means for generating the gating the marker and for sampling and measuring the video signal amplitude, of the additional switching unit, two multiplication units, a comparison circuit, and a unit for controlling the object temperature allows, in addition to measuring the temperature of the object, an easier and more efficient control of its temperature conditions.

It is preferable that the thermovision pyrometer further comprise a first video signal switching means, its signal input being connected to the output of the television camera, its first and second control inputs being connected to the third and fourth outputs, respectively, of the information signal switching means, a first store, its signal input being connected to the first output of the first video signal switching means, its first and second control inputs being connected to the third and fourth outputs, respectively, of the information signal switching means, and its third control input being connected to the synchronizing output of the television camera, a division unit, its first input being connected to the second output of the first video signal switching means and the second input being connected to the output of the first store, a second store, its first and second control inputs being connected to the fourth and third outputs, respectively, of the information signal switching means, its third control input being connected to the synchronizing output of the television camera, and the signal input being connected to the output of the division unit, and a second video signal switching means, its first input being connected to the output of the division unit, its second signal input being connected to the output of the second store, its first and second control inputs being connected to the third and fourth outputs, respectively, of the information signal switching means, its third control input being connected to the synchronizing output of the television camera, and the output being connected to the input of the television monitor.

Insertion of two video signal switching means, a division unit, and a pair of stores into the thermovision pyrometer circuit has enabled us to produce a temperature image of the object under investigation on the screen of the TV monitor which is free from shading distortion due to variation in sensitivity over the target area of the TV camera tube, resulting in a higher reliability of displaying the temperature profile of the object under investigation.

These and other objects and particular features of the present invention will be more apparent from the following detailed description of the embodiments thereof with reference to the accompanying drawings in which:

DETAILED DESCRIPTION OF THE INVENTION

Figure 1:
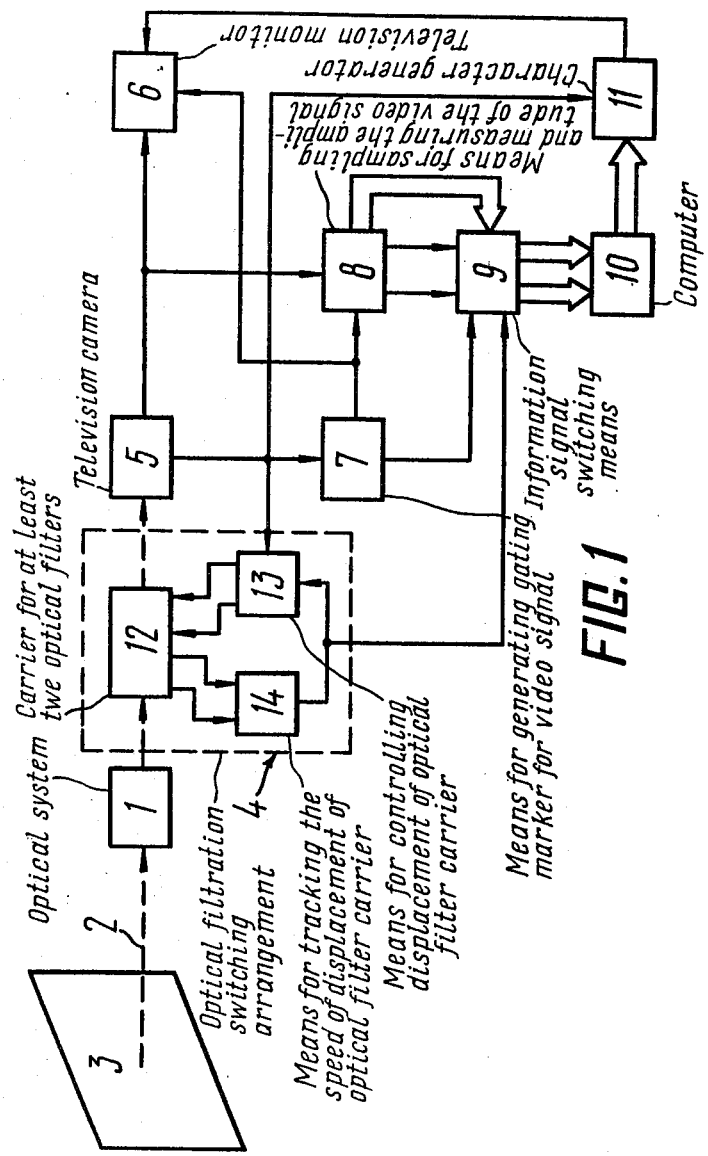
FIG. 1 is a block diagram of the thermovision pyrometer according to the invention.

The proposed thermovision pyrometer for remote measurement of temperature is composed of an optical part and an electrical part.

The optical part comprises an optical system 1 (FIG. 1) for focusing a flux 2 of thermal radiation emitted by an object 3 under investigation.

The optical system 1 may be of any known configuration and even in the form of an optical arrangement for aligning the images of two spaced-apart objects, i.e. those lying not in the same object plane nor on the same optical axis.

The specific manufacturing process of heating the object under investigation is not of importance as regards the essence of the present invention, and therefore, the object 3 is shown schematically, in the form of an object plane.

A switching arrangement 4 for optical filtration is positioned in the path of the thermal flux 2 travelling from the optical system 1 to a television camera 5 and intended for sequentially passing the spectral components of the focused thermal flux 2 in two or more different regions of the spectrum.

In addition to the optical path, the switching arrangement includes an electric circuit.

The electrical part of the thermovision pyrometer comprises a television camera 5 which serves for conversion of the thermal flux 2 to an electric signal carrying information about the temperature profile of the surface of the object 3 under investigation to produce a standard TV video signal for subsequent displaying thereof on the screen of the TV camera tube as a thermovision image of the object 3 under investigation. The camera generally comprises the television camera tube with a system for focusing and deflection of the electron beam, the video amplifier, the synchronization generator, and the vertical and horizontal scanning generators (not shown). The output of the video amplifier serves, at the same time, as the output of the television camera 5, while the output of the synchronization generator also serves as the synchronizing output of the television camera 5.

The TV camera tube in the television camera 5 is represented by a vidicon sensitive to the infrared spectral region of thermal radiation from the objects. Such a vidicon may have a target composed of amorphous semiconductor material based on $Sb_2S_3.Sb_2Se_3$ and PbO–PbS films, of monocrystalline silicon or germanium with special doping and mosaic P-n structure, as well as of triglycinesulphate-based pyroelectric materials. Vidicons with targets based on amorphous semiconductor films and pyroelectric materials are to be preferred, owing to their sensitivity within a reasonably wide spectral range allowing selection of two sufficiently narrow spectral regions of different wavelengths for satisfactory operation of the proposed thermovision pyrometer. A possibility exists of employing solid-state equivalents of TV camera tubes in the television camera 5 of the present thermovision pyrometer, i.e. photodetector matrices based on charge-coupled devices.

A video monitoring device 6 is formed by a television monitor permitting to observe on its screen a thermovision image of the object 3 under investigation generated by the inherent thermal radiation from the object 3.

The television monitor 6 generally comprises the video amplifier, the television picture tube, the vertical and horizontal scanning generators (not shown). The input of the television monitor 6 which acts, at the same time, as the input of the video amplifier is connected to the output of the television camera 5. The television monitor 6 is also used as an information display device (for displaying digital, character, graphical, and other kinds of information) and provided therefor with a number of additional information inputs.

A means 7 for generating the gating marker acts to select a point on the thermovision image of the object 3 observed on the screen of the television monitor 6 at which it is necessary to measure the temperature of the object 3. The means 7 has an input connected to the synchronizing output of the TV camera 5, to which horizontal and vertical synchronizing pulses are applied from the synchronization generator of the TV camera 5, and two outputs, of which the first output is connected to the first information input of the television monitor 6.

A gating marker signal is generated at this output, which is displayed on the screen of the television monitor as a bright movable dot. The position of this dot on the thermovision image of the object 3 under investigation likewise displayed on the screen of the television monitor 6 may be adjusted either manually or automatically using special control units (not shown) forming part of the gating marker generating means 7.

A means 8 for sampling and measuring the amplitude of the video signal is used for sampling the video signal from a set of lines of a television frame. Both this set of lines and the starting point of sampling within a line are determined by the position of the gating marker on the thermovision image of the object 3 under investigation. Here by the video signal sampling is meant extraction of the video signal of a particular portion of particular lines, measurement of the amplitude of the video signal extracted, and conversion of the measured value to digital form. The video signal amplitude sampling and measuring means 8 has two inputs, one of which called the signal input is connected to the output of the television camera 5, while the other, control, input is connected to the first output of the gating marker generating means 7.

Of the three outputs of the video signal amplitude sampling and measuring means 8 one is the information output comprising a plurality of electrical output terminals, their number being determined by the code length of the information presented and by the accuracy of measuring the amplitude of the video signal, and the two remaining outputs are hereinbelow termed the first output and the second output.

A switching means 9 for information signal is a switching device allowing separate extraction of the information about the spectral components of the radiation flux from the object 3 sequentially passed by the optical filtration switching arrangement 4, making use of the switching, in synchronism with the optical switching process, of electrical signals indicative of the amplitudes of the video signals for the respective spectral regions. The information signal switching means 9 has one information input composed of a plurality of electrical input terminals and connected to the information output of the means 8 for sampling and measuring the video signal amplitude, the number of input terminals of the switching means 9 being determined by the number of output terminals of the means 8, four control inputs, the first input being connected to the output of the optical filtration switching arrangement 4, the second input being connected to the second output of the gating marker generating means 7, and the third and fourth inputs being connected to the first and second outputs, respectively, of the means 8 for sampling and measuring the video signal amplitude, and two information signal outputs constituting two pluralities of information output terminals, their number at each output being determined by the code length of the information arriving at the information input of the switching means 9.

A computer 10 is a program-controlled electronic computer unit which is employed for calculation of the ratio of two information signals applied to its two inputs from the outputs of the information signal switching means 9, determination of the colour temperature value of the object from this ratio by retrieval of this value from its store, where a calibrated relation between the calculated video signal ratio and the temperature of the object under investigation had been previously stored, automatic correction for the selectivity of radiation of the object 3 under investigation, storage of the information about the distribution of temperature over the entire surface of the object 3 being scanned or along a predetermined scan line, and presentation of this information at its output in accordance with the operating conditions specified. The structure of the computer 10 is well known to those skilled in the art and not shown in detail in the figure.

A character generator 11 is a device for generating television images of a variety of characters, digits, frames, plots of thermal profile, isothermal lines, and other information displayed on the screen of the television monitor 6. Its information input constituting a plurality of electrical input terminals, their number being determined by the plurality of electrical output terminals of the information output of the computer 10, is connected to the output of the computer 10, its synchronizing input is connected to the synchronizing output of the television camera 5, and its output is connected to the second information input of the television monitor 6. The character generator enables the television monitor 6 to be also used as a video terminal (or display terminal) of the computer 10 displaying numerical data concerning the temperature of the object 3 both at a selected point on its surface and along a selected line of scanning, or even in a particular set of selected points combined to form an isothermal region. It results in certain advantages of the use of the thermovision pyrometer residing in the fact that both the thermal image of the object 3 and the position of the selected points on the surface of the object 3 and the temperature value of the object 3 at these points are simultaneously and continuously indicated in one and the same part of the test device, so that most of the operator's attention can be centred thereon.

Circuit useful for constructing the character generator 11 is well known in the art (cf. U.S. Pat. Nos. 3,752,973; 3,689,694; 3,821,468; and ANCHOR, 'An Electronic Character Generator'; BBC Eng. Div. Mongr., 1970, No. 84) and is not shown.

The optical filtration switching arrangement 4 comprises a carrier 12 for optical filters, a means 13 for controlling the displacement of the optical filter carrier 12, its first input being connected to the synchronizing output of the television camera 5, a means 14 for tracking the speed of displacement of the optical filter carrier 12, its output being connected to the second input of the means 13 for controlling the displacement of the carrier 12 and to the first control input of the information signal switching means 9.

The optical filter carrier 12 is formed by a frame 15 (FIG. 2) carrying two filters 16 and 17 differing in wavelength of the radiation passed and having ferromagnetic tips 18, 19 disposed at its opposite ends on a line parallel to the line passing through the centres of the optical filters 16, 17, a pair of electromagnets 20, 21 alternately interacting with the respective ferromagnetic tips 18, 19, and two optoelectronic couplings 22, 23 so positioned that the frame 15, in one of its steady states as it travels in a plane parallel to the plane of a target 24 of a vidicon 25 of the television camera 5, breaks the optical connection in the optoelectronic coupling 23 without disrupting the optical connection in the optoelectronic coupling 22, while in the other steady state, conversely, it does not disrupt the optical connection in the optoelectronic coupling 23, but acts to break the optical connection in the optoelectronic coupling 22. The optoelectronic couplings 22, 23 consist of radiation sources 26 (FIG. 3) (such as light-emitting diodes) and photodetectors (such as photodiodes or phototransistors).

The means 14 for tracking the displacement speed of the optical filter carrier 12 comprises two amplifiers 28, 29, the inputs of each of them being connected to the outputs of the photodetectors 27 of the respective optoelectronic couplings 22, 23 (FIG. 2), a coincidence circuit 30 (FIG. 3), its first input being connected to the output of the amplifier 28, its second input being connected to the output of the amplifier 29, and its output being connected to the first control input of the information signal switching means 9 (FIG. 1).

The means 13 for controlling the displacement of the carrier 12 comprises a phase detector 31 (FIG. 3), its first input being connected to the synchronizing output of the television camera 5 (FIG. 1), and its second input being connected to the output of the coincidence circuit 30 (FIG. 3), a power source 32 with its control input connected to the output of the phase detector 31, and an electronic switch 33, its signal input being connected to the output of the power source 32, its control input being connected to the synchronizing output of the television camera 5 (FIG. 1), and the two outputs being connected to the respective electromagnets 20, 21 (FIG. 3) of the optical filter carrier 12.

It would be reasonable to suppose that the specific mechanical design of the optical filtration switching arrangement 4 may be based, likewise, on any other method of optically filtering and switching the spectral components of the radiation flux, such as an electromechanical, electrooptical, optoacoustical method, etc.

Figure 4:
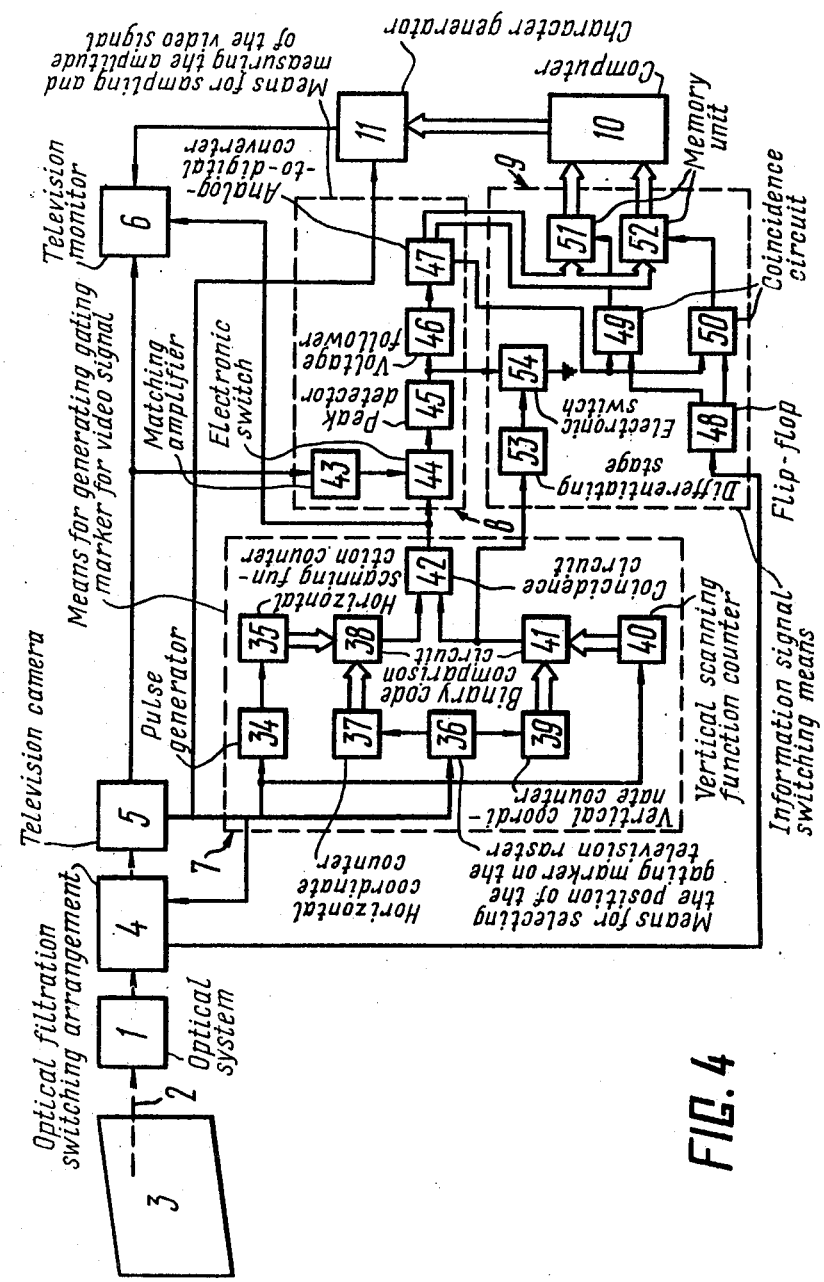
FIG. 4 is an embodiment of the block diagram of the thermovision pyrometer, according to the invention.

In an embodiment of the thermovision pyrometer shown in FIG. 4, the gating marker generating means 7 (FIGS. 1, 4) comprises a pulse generator 34, its input being driven by line synchronizing pulses from the synchronizing output of the television camera, a horizontal scanning function counter 35 with its input connected to the output of the pulse generator 34, a means 36 for selecting the position of the gating marker on the television raster, its input being driven by frame synchronizing pulses from the synchronizing output of the television camera 5, a horizontal coordinate counter 37 with its input connected to the output of the gating marker position selecting means 36, a binary code comparison circuit 38, its first input being connected to the output of the horizontal scanning function counter 35, and its second input being connected to the output of the horizontal coordinate counter 37, a vertical coordinate counter 39 with its input connected to the second output of the means 36 for selecting the gating marker position on the television raster, a vertical scanning function counter 40 driven by line synchronizing pulses from the synchronizing output of the television camera 5, a binary code comparison circuit 41, its first input being connected to the output of the vertical scanning function counter 40, its second input being connected to the output of the vertical coordinate counter 39, and its output being connected to the second control input of the information signal switching means 9, a coincidence circuit 42 (FIG. 4) with its first input connected to the output of the binary code comparison circuit 38 and the second input connected to the output of the binary code comparison circuit 41, and its output connected to the first information input of the television monitor 6.

The specific realizations of the horizontal and vertical scanning function counters 35 and 40, the horizontal and vertical coordinate counters 37 and 39, the binary code comparison circuits 38 and 41 are well known in the art and will not be described in greater detail below (cf. Guglin I. N., "Electronic Synthesis of Television Images", M. Sovetskoye Radio, 1979, pp. 122–130, FIGS. 4, 5).

The means 35 for selecting the position of the gating marker on the television raster may include a control desk equipped with appropriate controls and a keyboard for manual and automatic positioning of the marker on the screen of the television monitor 6.

The means 8 for sampling and measuring the amplitude of the video signal comprises a matching amplifier 43 with its input connected to the output of the television camera 5, an electronic switch 44, its signal input being connected to the output of the matching amplifier 43, and the control input being connected to the output of the coincidence circuit 42 of the gating marker generating means 7, a peak detector 45, its input being connected to the output of the electronic switch 44 and its output being connected to the third control input of the information signal switching means 9, a voltage follower 46 with its input connected to the output of the peak detector 45, an analog-to-digital converter 47, its input being connected to the output of the voltage follower 46, the gating output being connected to the fourth control input of the switching means 9, and the information output being connected to the information input of the information signal switching means 9. The specific circuits of the matching amplifier 43, the electronic switch 44, the voltage follower 46, and the analog-to-digital converter 47 are well known in the art and will not be discussed in detail. The peak detector 45 is formed by a capacitor charged through a diode connected to the output of the electronic switch 44 by a video pulse sampled by the switch 44 until some constant voltage value is reached which is proportional to the amplitude of this video pulse.

The information signal switching means 9 comprises a flip-flop 48, its input being connected to the output of the coincidence circuit 30 (FIG. 3) of the means 14 for tracking the speed of displacement of the optical filter carrier of the optical filtration switching arrangement 4 (FIG. 1), a coincidence circuit 49 (FIG. 4), its first input being connected to the gating output of the analog-to-digital converter 47 of the video signal amplitude sampling and measuring means 8, and its second input being connected to the first output of the flip-flop 48, a coincidence circuit 50, its first input being connected to the gating output of the analog-to-digital converter 47 of the video signal amplitude sampling and measuring means 8, and its second input being connected to the second output of the flip-flop 48, a memory unit 51, its control input being connected to the output of the coincidence circuit 49, its information input being connected to the information output of the analog-to-digital converter 47 of the video signal amplitude sampling and measuring means 8, and its output being connected to the first input of the computer 10, a memory unit 52, its control input being connected to the output of the coincidence circuit 50, its information input being connected to the information output of the analog-to-digital converter 47 of the video signal amplitude sampling and measuring means 8, and its output being connected to the second input of the computer 10, a differentiating stage 53, its input being connected to the output of the binary code comparison circuit 41 of the gating marker generating means 7, an electronic switch 54, its control input being connected to the output of the differentiating stage 53, its signal input being connected to the output of the peak detector 45 of the video signal amplitude sampling and measuring means 8, and the output being grounded. The circuits 49, 50 represent logic AND-elements, the units 51, 52 are intermediate memory elements based on D-flip-flops, the differentiating stage 53 is a means for extraction of the leading edge of the short pulse at the output of the binary code comparison circuit 41 to generate a much shorter pulse compared to the input pulse delivered from the output of the circuit 41 to control the electronic switch 54.

When using the thermovision pyrometer shown in FIGS. 1 and 4 for measuring the temperature of the object 3 under investigation, measurement errors may occur due to instability of the video signal amplitude reference level obtained by the means 8 for sampling and measuring the amplitude of the video signal. Any adjustment or readjustment of the circuits of the television camera 5 may result in misalignment of the black level to which the output of the television camera 5 is clamped. In addition, when the vidicon in the TV camera 5 that has become inoperative is replaced by a new camera tube, a dark current level may be changed and the level of the dc component of the output video signal is consequently affected. Any change in dc components of the video signal amplitudes to be measured, while maintaining a constant density of the spectral components of the radiation flux 2 from the object 3 under investigation, would bring about a change in the measured amplitude ratio of the video signals corresponding to these spectral components of the thermal radiation flux 2. In order to eliminate this temperature measurement error, the video signal amplitude reference value needs to be clamped to some constant level which could be varied in proportion both to the change in the dark current level of the camera tube 25 and to the change in the black level in the video amplifier of the television camera 5. Such a level might define a video signal generated by the reference radiation source with a stabilized temperature. In this case the temperature of the reference radiation source is chosen so that the density of its radiation flux is slightly in excess of the threshold sensitivity level of the TV camera tube causing a scarcely visible image of this source to appear on the screen of the TV monitor 6. The clamping of the video signal amplitude reference value to the video signal from the reference radiation source can be accomplished by means of a thermovision pyrometer shown in FIGS. 5, 6.

The thermovision pyrometer further comprises a means 55 (FIGS. 5, 6) for generating the reference radiation flux, formed by a device such as the pyrometric reference lamp or the black body model, the radiation flux therefrom being projected, through the optical system 1 and the optical filtration switching arrangement 4, to the phototarget 24 (FIG. 2) of the camera tube 25 (FIG. 3) of the television camera 5 (FIG. 5), a means 56 for generating the gating marker for the video signal proportional to the density of the reference radiation flux, its first input being connected to the synchronizing output of the television camera 5, the second input being connected to the third output of the means 7 for generating the gating marker for the video signal proportional to the density of the flux from the object 3 under investigation, and the output being connected to the third information input of the television monitor 6, a means 57 for sampling and measuring the video signal amplitude, its first control input being connected to the output of the gating marker generating means 56, the second and third control inputs being connected to the third and fourth outputs, respectively, of the information signal switching means 9, a logarithmic division unit 58, its first and second inputs being connected to the first and second outputs, respectively, of the video signal amplitude sampling and measuring means 57, a video signal clamping circuit 59, its signal input being connected to the output of the television camera 5, its control input being connected to the output of the logarithmic division unit 58, and its output being connected to the signal inputs of the means 8 and 57 for sampling and measuring the video signal amplitude.

Unlike the gating marker generating means 7, the gating marker generating means 56 (FIG. 6) includes only a unit 60 for selecting the position of the gating marker on the TV raster, horizontal and vertical coordinate counters 61 and 63, respectively, binary code comparison circuits 62 and 64, and a coincidence circuit 65 which are quite identical to the unit 36 for selecting the position of the gating marker on the TV raster, the horizontal and vertical coordinate counters 37 and 39, the binary code comparison circuits 38 and 41, and the coincidence circuit 42, respectively, of the gating marker generating means 7.

The first input of the binary code comparison circuit 62 of the gating marker generating means 56 is connected to the output of the horizontal scanning function counter 35 of the gating marker generating means 7, while the first input of the binary code comparison circuit 64 of the gating marker generating means 56 is connected to the output of the vertical scanning function counter 40 of the gating marker generating means 7.

The means 57 for sampling and measuring the amplitude of the video signal comprises a coincidence circuit 66, its first input being connected to the output of the coincidence circuit 65 of the gating marker generating means 56, its second input being connected to the first output of the flip-flop 48 of the information signal switching means 9, a coincidence circuit 67, its first input being connected to the output of the coincidence circuit 65 of the gating marker generating means 56, its second input being connected to the second output of the flip-flop 48 of the information signal switching means 9, a matching amplifier 68 with its input connected to the output of the video signal clamping circuit 59, an electronic switch 69, its signal input being connected to the output of the matching amplifier 68, and its control input being connected to the output of the coincidence circuit 66, an electronic switch 70, its signal input being connected to the output of the matching amplifier 68 and its control input being connected to the output of the coincidence circuit 67, two peak detectors 71, 72, the inputs thereof being connected each to the outputs of the electronic switches 69, 70, respectively, two followers 73 and 74, the inputs thereof being connected each to the outputs of the peak detectors 71 and 72, respectively.

The logarithmic division unit 58 comprises two logarithmic amplifiers 75, 76, their inputs being connected each to the outputs of the voltage followers 73, 74, respectively, of the video signal amplitude sampling and measuring means 57, a comparison circuit 77, its first input being connected to the output of the logarithmic amplifier 75, its second input being connected to the output of the logarithmic amplifier 76, and its output being connected to the control input of the video signal clamping circuit 59.

The video signal clamping circuit 59 represents a sequence of amplifying regulating elements. The regulating element may be formed by a single common-emitter transistor stage with the base circuit as the input thereof and the collector load output as the output thereof (not shown). The controlling signal which controls the dc component of the collector voltage, i.e. the dc component of the video output, is applied to the emitter circuit. The phase of the controlling signal applied to the regulating element of the video signal clamping circuit 59 from the output of the logarithmic division unit 58 must be such as to provide negative gain feedback in the video signal clamping circuit 59.

Figure 7:
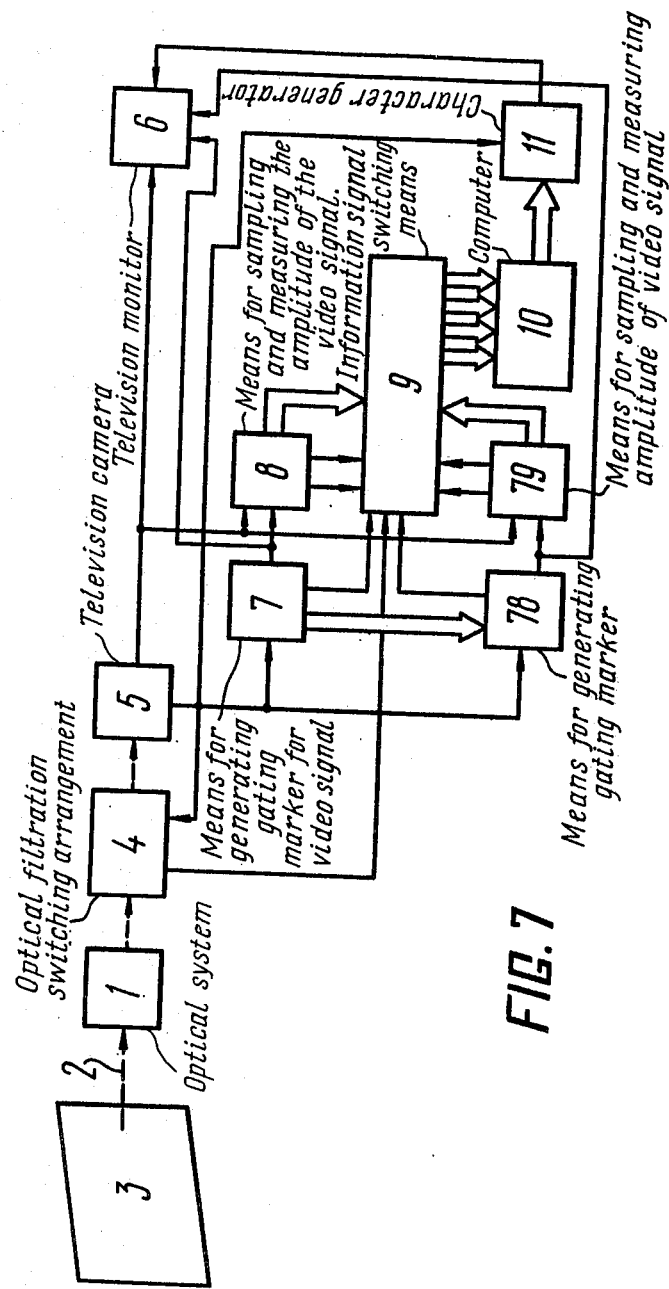
FIG. 7 is still another embodiment of the block diagram of the thermovision pyrometer, according to the invention.

FIG. 7 shows an embodiment of the thermovision pyrometer enabling the temperature of the object 3 under investigation to be monitored simultaneously at two points on its surface and allowing a direct measurement of the temperature difference at these two points on the surface of the object 3 under investigation. To this end, the thermovision pyrometer comprises a means 78 for generating the gating marker, its input being connected to the synchronizing output of the television camera 5, its clock input being connected to the clock output of the gating marker generating means 7, its first output being connected to the third information input of the television monitor 6, and its second output being connected to the fifth control input of the information signal switching means 9, and a means 79 for sampling and measuring the amplitude of the video signal, its signal input being connected to the output of the television camera 5, its control input being connected to the first output of the gating marker generating means 78, its information output being connected to the second information input of the information signal switching means 9, and the first and second outputs being connected to the sixth and seventh control inputs, respectively, of the information signal switching means 9, the third and fourth information outputs being connected to the third and fourth inputs, respectively of the computer 10.

Figure 5:
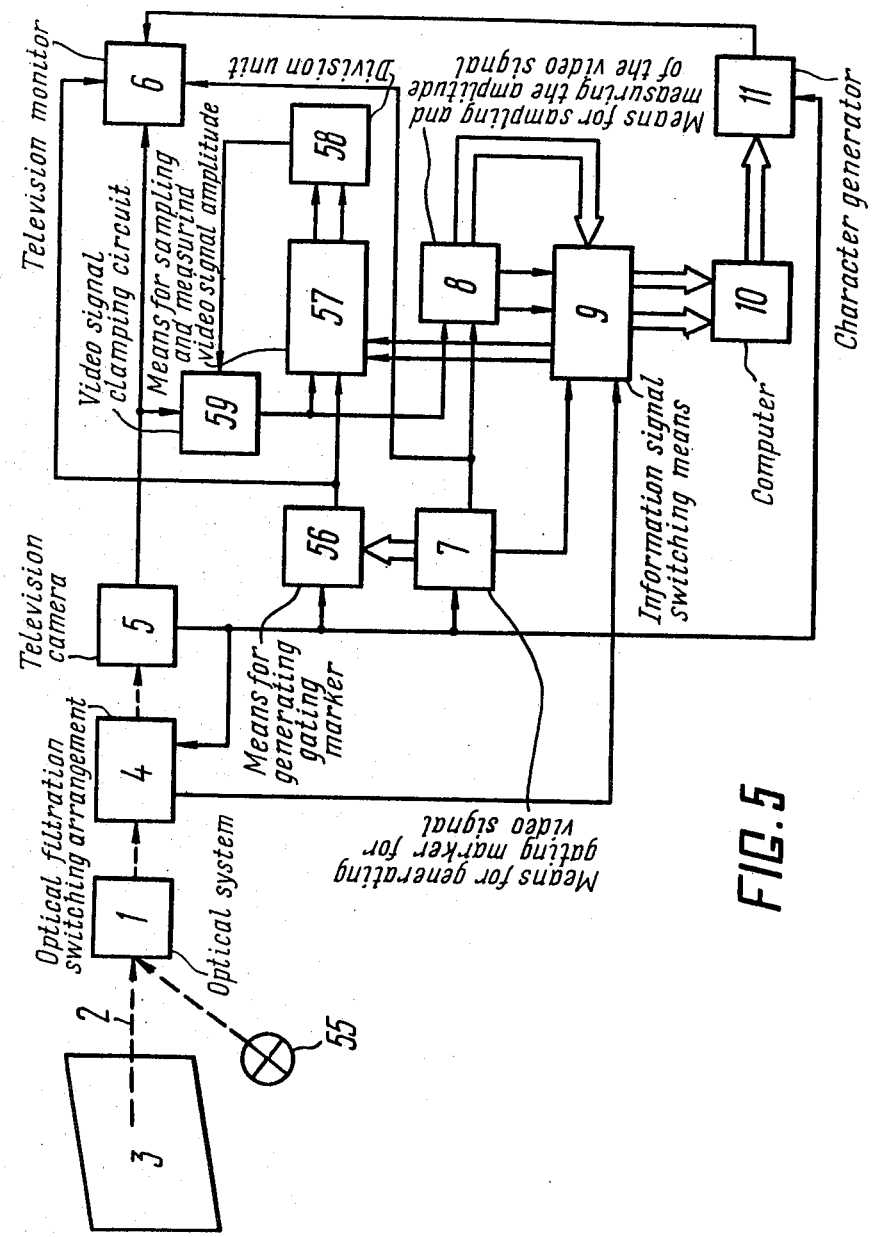
FIG. 5 is another embodiment of the block diagram of the thermovision pyrometer, according to the invention.
Figure 6:
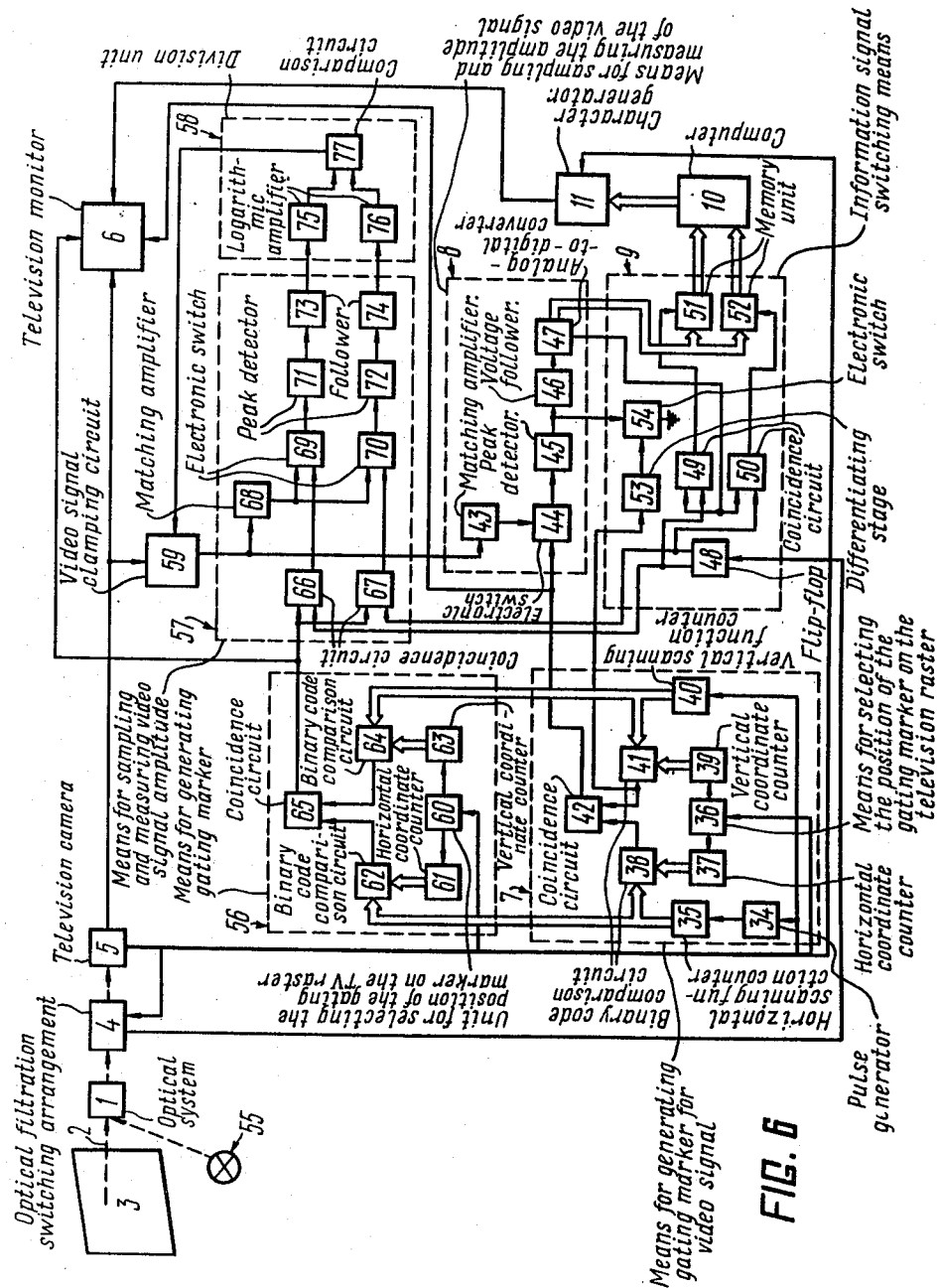
FIG. 6 is another embodiment of the block diagram of the thermovision pyrometer, according to the invention.

The construction of the gating marker generating means 78 is identical to that of the gating marker generating means 56 (FIGS. 5, 6).

The construction of the means 79 (FIG. 7) for sampling and measuring the video signal amplitude is identical to that of the means 8 for sampling and measuring the video signal amplitude.

Figure 8:
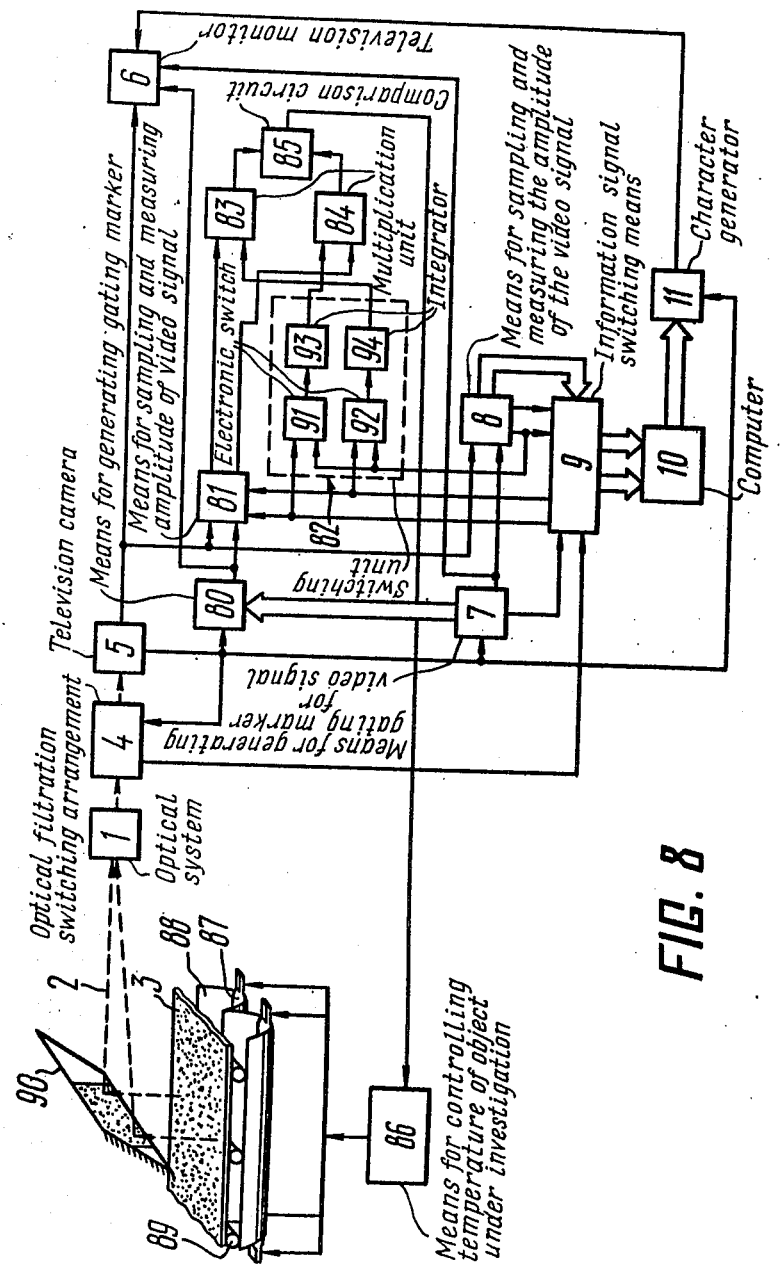
FIG. 8 is yet another embodiment of the block diagram of the thermovision pyrometer, according to the invention.

FIG. 8 illustrates an embodiment of the thermovision pyrometer which, in addition to direct temperature or temperature difference measurement at selected points on the object 3 under investigation, can effect a controlling (or regulating) action on the object 3, for example, control the uniform heating of the sheet material processed on a rolling mill.

The thermovision pyrometer comprises a means 80 (FIG. 8) for generating the gating marker, its input being connected to the synchronizing output of the television camera 5, its clock input being connected to the clock output of the gating marker generating means 7, and the output being connected to the third information input of the television monitor 6, a means 81 for sampling and measuring the video signal amplitude, its signal input being connected to the output of the television camera 5, the first control input being connected to the output of the gating marker generating means 80, and the second and third control inputs being connected to the third and fourth outputs, respectively, of the information signal switching means 9, a switching unit 82, the first and second control inputs thereof being connected to the third and fourth outputs, respectively, of the information signal switching means 9, the signal input being connected to the first output of the video signal amplitude sampling and measuring means 8, a multiplication unit 83, the first input thereof being connected to the first output of the video signal amplitude sampling and measuring means 81, the second input therof being connected to the first output of the switching unit 82, a multiplication unit 84, the first input thereof being connected to the second output of the switching unit 82, the second input thereof being connected to the second output of the video signal amplitude sampling and measuring means 81, a comparison circuit 85, its first input being connected to the output of the multiplication unit 83, its second input being connected to the output of a means 86 for controlling the temperature of the object 3 under investigation which may be, for example, a rolled metal sheet subjected, either previously or just in the process of treatment, to heating, e.g, by means of power radiators 87 (quartz infrared incandescent lamps) located in the focal points of reflectors 88 cooled, for example, with running water, under rotating rolls 89 of the rolling mill. The radiators 87 are placed under a particular portion of the sheet 3. The heating zones of individual radiators may overlap to some extent so as to avoid cold gaps. Each radiator 87 is connected to particular outputs of the means 86 for controlling the temperature of the object 3 which is essentially a regulator of the power consumed by the radiator 87. The thermal radiation flux 2 from the hot sheet can be sighted by the thermovision pyrometer using such devices as optical mirror elements 90.

The gating marker generating means 80 is designed identically to the gating marker generating means 56 (FIGS. 5, 6), while the means 81 (FIG. 8) for sampling and measuring the amplitude of the video signal, is identical to the video amplitude sampling and measuring means 57 (FIGS. 5, 6).

The switching unit 82 (FIG. 8) includes two electronic switches 91 and 92, their first inputs being connected to the third and fourth outputs, respectively, of the information signal switching means 9, and their second inputs being connected to each other and to the output of the video amplitude sampling and measuring means 8, and two integrators 93, 94. The input of the integrator 93 is connected to the output of the electronic switch 91, and the output is connected to one of the inputs of the multiplication unit 84. The input of the integrator 94 is connected to the output of the electronic switch 92, and its output is connected to one of the inputs of the multiplication unit 83.

The specific realization of the multiplication units 83, 84, the comparison circuit 85, and the means 86 for controlling the temperature of the object 3 will not be discussed in detail, since any circuit known in the art may be used for the purpose.

All the aforementioned circuits of different embodiments of the thermovision pyrometer provide a high accuracy of measuring the temperature of the object 3 under investigation at some preselected points on its surface. Such a thermovision pyrometer, however, fails to provide a true and satisfactory 'temperature' image on the face of the television monitor 6 (FIG. 1). The following difficulty is here encountered. In the first place, in all the cases considered above, the operator will observe on the screen of the television monitor 6 a conventional 'thermal' image of the object 3 under investigation, i.e. the image containing information both on the temperature of the object being investigated and on the variation in emissivity of the surface of the object 3 to be scanned, and on variation in sensitivity over the target 24 of the camera tube 25 of the television camera 5, but it will be only observed sequentially, in two spectral regions extracted by the optical filtration switching arrangement 4. In the second place, on account of optical filtration of the radiation flux 2 from the object 3 in two different spectral regions, the density of the spectral components filtered will be naturally different. It results in amplitude difference of the video signals in two adjacent television frames (or fields), which in turn leads to different integral screen brightnesses of the television monitor 6, which manifests itself visually as a reduced frame scanning frequency and a flicker effect on the screen of the television monitor 6.

As a result of experimental investigation, it was found that in order that the thermovision image on the screen of the television monitor 6 contain only information on the temperature profile of the surface of the object 3 under investigation, while eliminating distortion and some ambiguity in identification of the thermovision image due to non-uniform emissivity of the surface of the object 3 under investigation (e.g. integral circuits and other semiconductor devices) and to variation in sensitivity of the phototarget 24 of the vidicon 25 of the television camera 5, it is possible, in processing the video signal generating the thermovision image, to use the same methods as in processing the measured amplitudes of the video pulses for different spectral components of the radiation flux 2 from the object 3, i.e. it is necessary to generate a 'relative' video signal produced by division of the analog video signal of the same picture elements of the object 3, as the radiation flux 2 therefrom is sighted in two different regions of the spectrum. While integration of the video pulses sampled by the gating marker is employed in temperature measurement of the spectral ratio for a particular point of the thermovision image, the maximum rate of temperature reading being determined by duration of two scanning frames (or fields), the integration method is essentially impracticable for generation of the 'relative' video signal, and the ratio of the video signals for the same picture elements can be obtained by delaying the video signal of one television frame produced in sighting one of the spectral components of the radiation flux 2 from the object 3, for the time equal to the frame (or field) duration. Such a delay may be provided by a working storage recording one of the television frames and reading the frame recorded at the moment the video signal of a second television frame arrives at the input of the high-speed analog division unit.

Since one scanning frame (or field) is 'lost' in the process of generation of the 'relative' video signal, it is necessary, to make up for the information lost, to reproduce one and the same frame of the 'relative' video signal twice, which can also be done with the aid of an additional working storage acting to record the 'relative' video signal at the moment of its generation and reproduction on the screen of the television monitor 6, and while the first storage is recording each successive frame of the TV picture (there is no 'relative' video signal at the output of the division unit at the moment), it is reproducing the 'relative' video signal stored on the screen of the television monitor 6.

Figure 9:
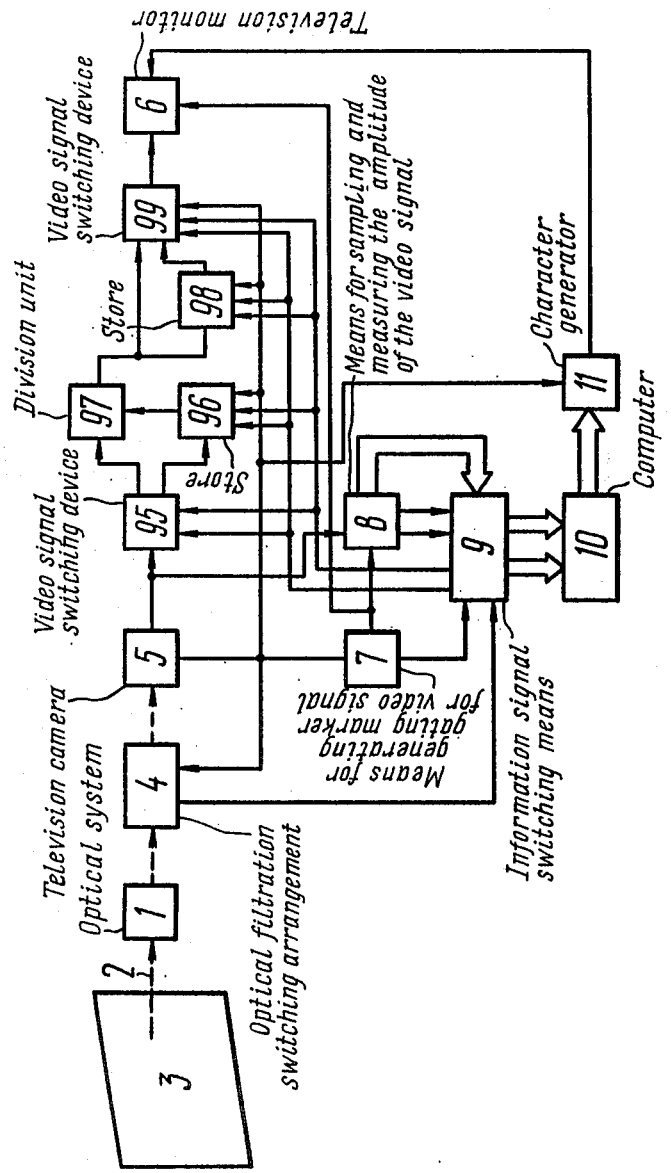
FIG. 9 is another embodiment of the block diagram of the thermovision pyrometer, according to the invention.

The circuit of the thermovision pyrometer allowing direct observation of the 'temperature' image of the object 3 under investigation on the screen of the television monitor 6 simultaneously with temperature measurement of the spectral ratio at a separate selected point of the television raster is shown in FIG. 9.

The thermovision pyrometer of FIG. 9 further comprises a video signal switching device 95, its signal input being connected to the output of the television camera 5, the first and second control inputs being connected to the third and fourth outputs, respectively, of the information signal switching means 9, a store 96, its signal input being connected to the first output of the video signal switching device 95, the first and second control inputs being connected to the third and fourth outputs, respectively, of the information signal switching means 9, the third control input being connected to the synchronizing output of the television camera 5, a division unit 97, its first input being connected to the second output of the video signal switching device 95, its second input being connected to the output of the store 96, a store 98, its signal input being connected to the output of the division unit 97, the first and second control inputs being connected to the fourth and third outputs, respectively, of the information signal switching means 9, the third control input being connected to the synchronizing output of the television camera 5, a video signal switching device 99, its first signal input being connected to the output of the division unit 97, the second signal input being connected to the output of the store 98, the first and second control inputs being connected to the third and fourth outputs, respectively, of the information signal switching means 9, the third control input being connected to the synchronizing output of the television camera 5, and the output being connected to the input of the television monitor 6.

The video signal switching device 95 includes two electronic switches (not shown), their signal inputs being connected to each other and to the output of the television camera 5, the control inputs being connected to the first and second outputs, respectively, of the flip-flop 48 (FIG. 6) of the information signal switching means 9 (FIG. 9), and the outputs being connected to the signal input of the store 96 and the first input of the division unit 97, respectively.

The video signal switching device 99 includes two electronic switches (not shown), the signal inputs of each of them being connected to the output of the store 98 and the output of the division unit 97, respectively, and the outputs being interconnected, and a signal mixer (not shown), its first input being connected to the outputs of the electronic switches, the second input being connected to the synchronizing output of the television camera 5, and the output connected to the input of the television monitor 6.

The stores 96 and 98 comprise high-speed digital elements (analog-to-digital and digital-to-analog converters, a memory matrix, and a read-write control unit). Their specific realizations are well known in the art and will not be discussed in greater detail below.

Figure 10:
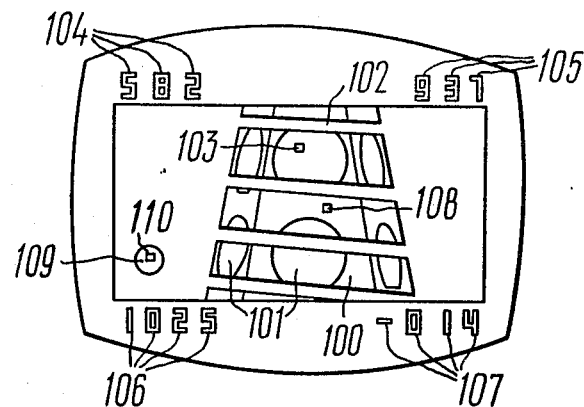
FIG. 10 is an example of the thermovision image of the object under investigation, according to the invention.

FIG. 10 shows an example of displaying the thermovision image of the object 3 under investigation and alphanumerical information on the temperature at the points being monitored on the surface of the object 3.

The object 3 under investigation is represented by an expitaxial installation heater in the form of a truncated polyhedral pyramid 100 of graphite, with semiconductor plates 101 closely held against the faces thereof. The pyramid 100 is heated by high-frequency currents supplied from the inductor with its turns 102 appearing as dark areas against the light background of the hot pyramid. The pyramid 100 itself is a bright image against the darker 'cold' background. The plates 101 appear dark against the lighter pyramid, as their temperature is slightly lower due to thermal resistance of the interface 'pyramid surface/plate'. The distribution of brightness over the thermovision image is indicative of the temperature profile of the surface of the object 3 (FIG. 1) under investigation. The specific temperature measurement point on the surface of the object is defined by the position of a moving marker dot 103 (FIG. 10) on the thermovision image of the object 3. The video amplitude value measured with the aid of the marker dot 103, for the radiation flux 2 (FIG. 1) of a shorter wavelength, is indicated (in mV) in a top left information register 104 (FIG. 10) while for the radiation flux 2 (FIG. 1) of a greater wavelength, it is indicated in a top right information register 105 (FIG. 10). A bottom left information register 106 indicates the temperature value of the object 3 (FIG. 1) at a point marked by the marker dot 103 (FIG. 10), calculated with the aid of the computer 10 (FIG. 1). In a bottom right information register 107 (FIG. 10) is indicated the temperature difference between two points on the surface of the object 3 (FIG. 1) directly measured by the thermovision pyrometer of FIG. 7. A second marker dot 108 (FIG. 10) indicates the point on the surface of the object 3 (FIG. 1) whose temperature is compared with that of the point indicated by the marker dot 103 (FIG. 10). In the bottom left part of the screen, an image 109 of the reference radiation source 55 (FIG. 5) is generated, its temperature being monitored by a marker 110 (FIG. 10) for the purpose of clamping the video amplitude reference value.

Figure 11:
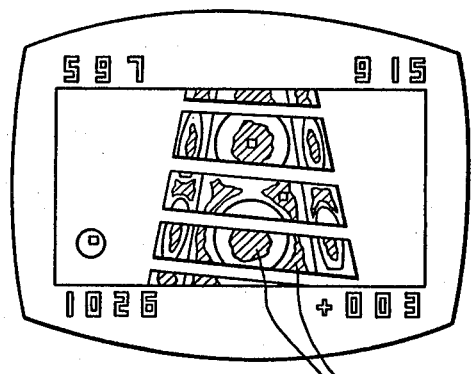
FIG. 11 is another example of the thermovision image of the object under investigation, according to the invention.
Figure 12:
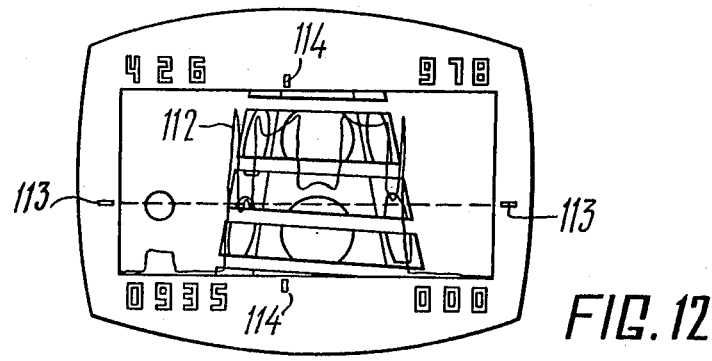
FIG. 12 is a further example of the thermovision image of the object under investigation, according to the invention.

FIGS. 11 and 12 show possible methods of analysis of the thermovision image based on isothermal lines and areas 111 (FIG. 11) and on thermal profile curves 112 (FIG. 12). The isotherms 111 (FIG. 11) and the thermal profile 112 (FIG. 12) may be generated by the electronic computer 10 (FIG. 1) and the character generator 11. They permit of a more effective analysis of the temperature distribution either over the entire surface of the object 3 under investigation (isotherms), or along a selected scanning line (thermal profile). The trajectory of the line along which the temperature distribution is analysed by means of the thermal profile 112 (FIG. 12) is determined by the positions of markers 113 on the vertical margin of the television raster, while the position of the particular point on the line, where a numerical evaluation of the object temperature is made, is defined by the positions of marker dots 114 on the horizontal margin of the TV raster, the video amplitudes for the respective spectral regions being also indicated by the information registers 104 and 105 (FIG. 10), and the temperature value of the spectral ratio being indicated in the information register 106.

The operation of the thermovision pyrometer now follows.

In order to measure the temperature of the object 3 under investigation (FIG. 1), the optical system 1, the optical filtration switching arrangement 4, and the television camera 5 should be placed in front of it.

Figure 2:
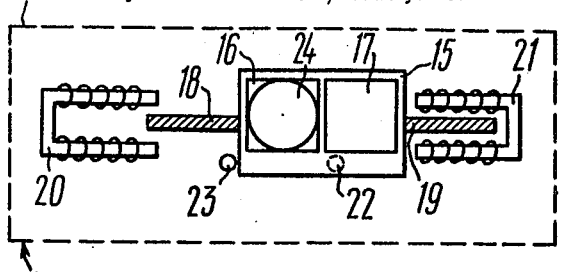
FIG. 2 is a schematic representation of the carrier for the optical filters, according to the invention.

The thermal radiation flux 2 from the object 3 under investigation is focused by the optical system 1, passed by one of the optical filters 16, 17 (FIGS. 2, 3) on the frame 15 of the carrier 12 for the optical filters 16, 17, and projected onto the phototarget 24 of the camera tube 25 of the television camera 5 (FIG. 1) to produce an infrared image of the object 3 (FIG. 1) in the plane of the target 24 (FIG. 2).

A video signal is generated at the output of the television camera 5 (FIG. 1), which is then applied to the input of the television monitor 6 causing a visible thermal image (FIGS. 10, 11, 12) of the object 3 under investigation (FIG. 1) to appear on the screen thereof, i.e. the image of thermal distribution of brightness at individual points (FIGS. 10, 11, 12) in proportion to the temperatures of the object 3 (FIG. 1) at the particular points on its surface.

In order that the temperature of the object 3 be measured at a particular point on its surface, the video amplitude should be measured at that point of the TV raster which corresponds to the thermovision image of the particular point on the surface of the object 3. To this end, some arrangements are included into the thermovision pyrometer, such as the means 7 for generating the gating marker and the means 8 for sampling and measuring the video amplitude.

There is no unique relationship, however, between the video amplitude measured and the temperature of the object 3. Its value is influenced by such parameters as the emissivity of the object 3, variation in sensitivity of the vidicon target 24 (FIG. 2), the distance from the object 3 (FIG. 1), characteristics of the optical system 1 and the video amplifier of the TV camera 5. For the purpose of elimination of these adverse effects that might influence accuracy of the temperature analysis at a particular point of the thermovision image, a 'relative' amplitude of the video signal must be measured, i.e. it is necessary to measure not the absolute amplitude of the video signal, but the ratio of two different video amplitudes obtained for the same point of the TV raster but for different spectral regions of the radiation flux 2 from the object 3. The resulting measurement is a signal dependent only on the temperature of the object 3 and capable of being calibrated in terms of a practical temperature scale.

In order to measure the video signal for the radiation flux 2 of varying spectral composition, it is required to previously separate these spectral components of the radiation flux and to 'discriminate' the video signal itself according to the respective spectral components of the radiation flux 2. Separation of the spectral components of the radiation flux 2 from the object 3 is accomplished by the optical filtration switching arrangement 4, and 'discrimination' of the video signal is made by the information signal switching means 9.

A detailed functional description of these devices is given hereinafter.

The television camera 5 generates, at its output, a video signal $U_5{}^I$ (FIG. 13, $a$), while line synchronizing pulses $U_5{}^{II}$ (FIG. 13, $b$) and frame synchronizing pulses $U_5{}^{III}$ (FIG. 13, $c$) are generated at the synchronizing output thereof. The means 13 for controlling the displacement of the carrier 12 is controlled by the frame synchronizing pulses $U_5{}^{III}$ applied for the purpose to one of the outputs of the phase detector 31 (FIG. 3) and to the control input of the electronic switch 33. A signal $U_{30}$ (FIG. 13, $f$) is applied simultaneously from the output of the coincidence circuit 30 (FIG. 3) to the other input of the phase detector 31, while a dc voltage (or current) is applied from the output of the power source 32 to the signal input of the electronic switch 33. A pulse $U_{33}$ (FIG. 13, $h$) from the first output of the electronic switch 33 is applied to the winding of the electromagnet 20 (FIG. 3), and a pulse $U_{33}$ (FIG. 13, $i$) is applied to the winding of the electromagnet 21 (FIG. 3) from the second output, for alternate energizing thereof.

As the electromagnet 20 is energized by the pulse $U_{33}$ (FIG. 13, $h$), the frame 15 (FIGS. 2, 3) starts moving to the left (looking at the picture of FIGS. 2, 3) as a result of pulling the ferromagnetic tip 18 into the electromagnet 20. This immediately breaks the optical connection of the optoelectronic coupling 23, i.e. the flux no longer arrives at the photodetector 27 from the radiation source 26, and consequently, the amplitude of the signal $U_{28}$ (FIG. 13, $d$) at the output of the amplifier 28 is minimized, whereas the amplitude of the signal $U_{29}$ (FIG. 13$e$) at the output of the amplifier 29 (FIG. 3) starts to increase. The signal $U_{29}$ (FIG. 13, $e$) at the output of the amplifier 29 (FIG. 3) will not reach its maximum value until the frame 15 (FIGS. 2, 3) has moved to its extreme left position.

Figure 3:
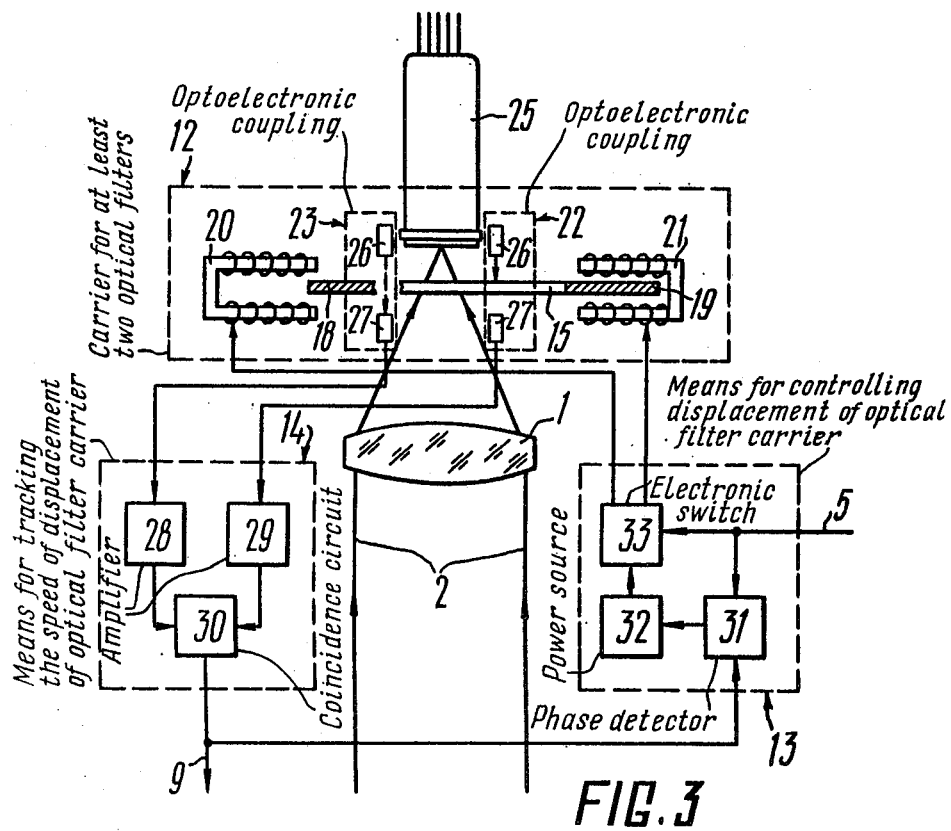
FIG. 3 is a schematic representation of the optical filtration switching arrangement, according to the invention.

When the frame 15 has reached its extreme left position, the thermal radiation flux 2 will pass through the filter 17. The frame 15 is retained in its extreme left position by the residual signal $U'_{33}$ (FIG. 13, $h$), its value being slightly below that occurring at the initial "starting point". As the next frame synchronizing pulse $U_5{}^{III}$ (FIG. 13, $c$) is applied to the input of the electronic switch 33 (FIG. 3), the pulse $U''_{33}$ (FIG. 13, $i$) at the second input of the electronic switch 33 (FIG. 3) reaches its initial triggering value sufficient for pulling the frame over to the right. The signal $U''_{33}$ (FIG. 13, $i$) at the first output of the electronic switch 33 will then be equal to zero. The signal $U''_{33}$ (FIG. 13, $i$) is applied to the winding of the electromagnet 21 (FIG. 3) and the frame 15 starts moving to the right. The optical connection of the optoelectronic coupling 22 is immediately disrupted, and the optical connection of the optoelectronic coupling 23 will not recover until after the frame 15 has moved to its extreme right position defined by the conditions of the complete interruption of the thermal radiation flux 2 from the object 3 (FIG. 1) by the optical filter 16 (FIGS. 2, 3). The frame 15 will be retained in this position under the action of the residual signal $U''_{33}$ (FIG. 13, $i$) until the next frame synchronizing pulse $U_5{}^{III}$ (FIG. 13 $c$) arrives at the input of the electronic switch 33.

Figure 13A:
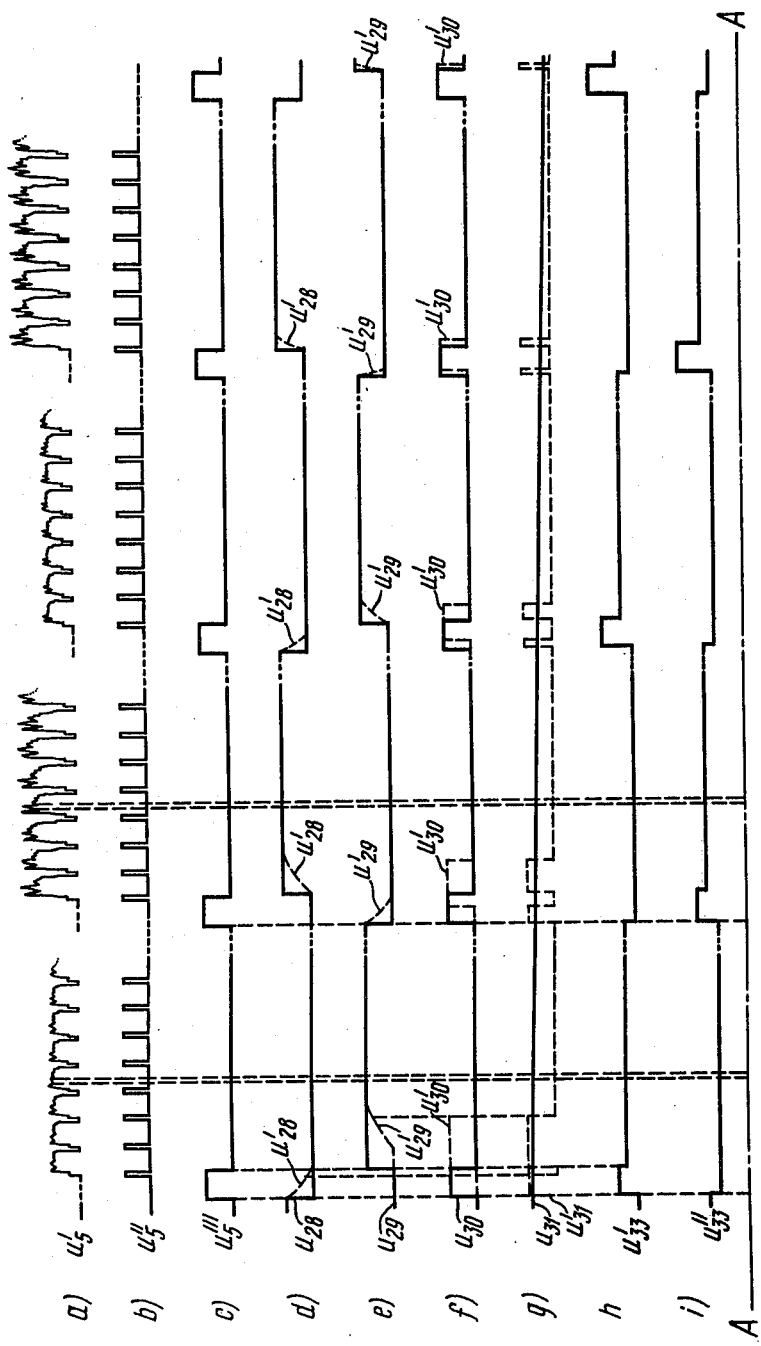
FIG. 13A–13C represents time diagrams of amplitude variation at the output of individual units, according to the invention.
Figure 13B:
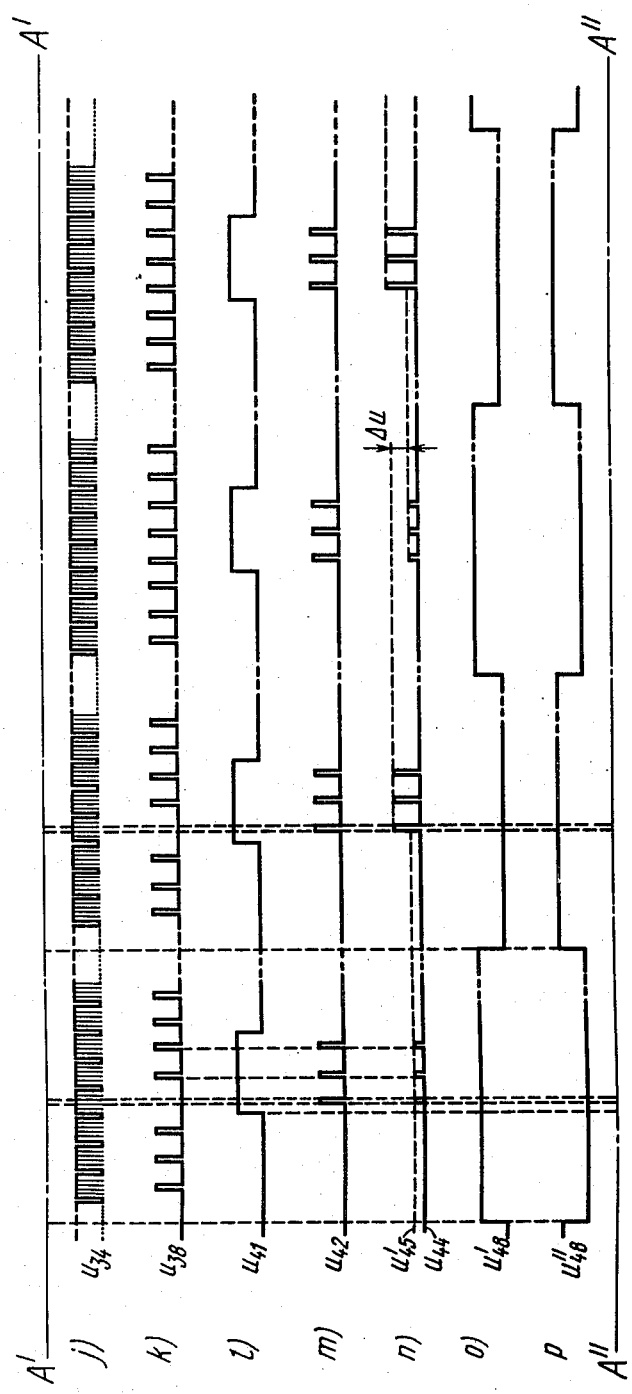
Figure 13C:
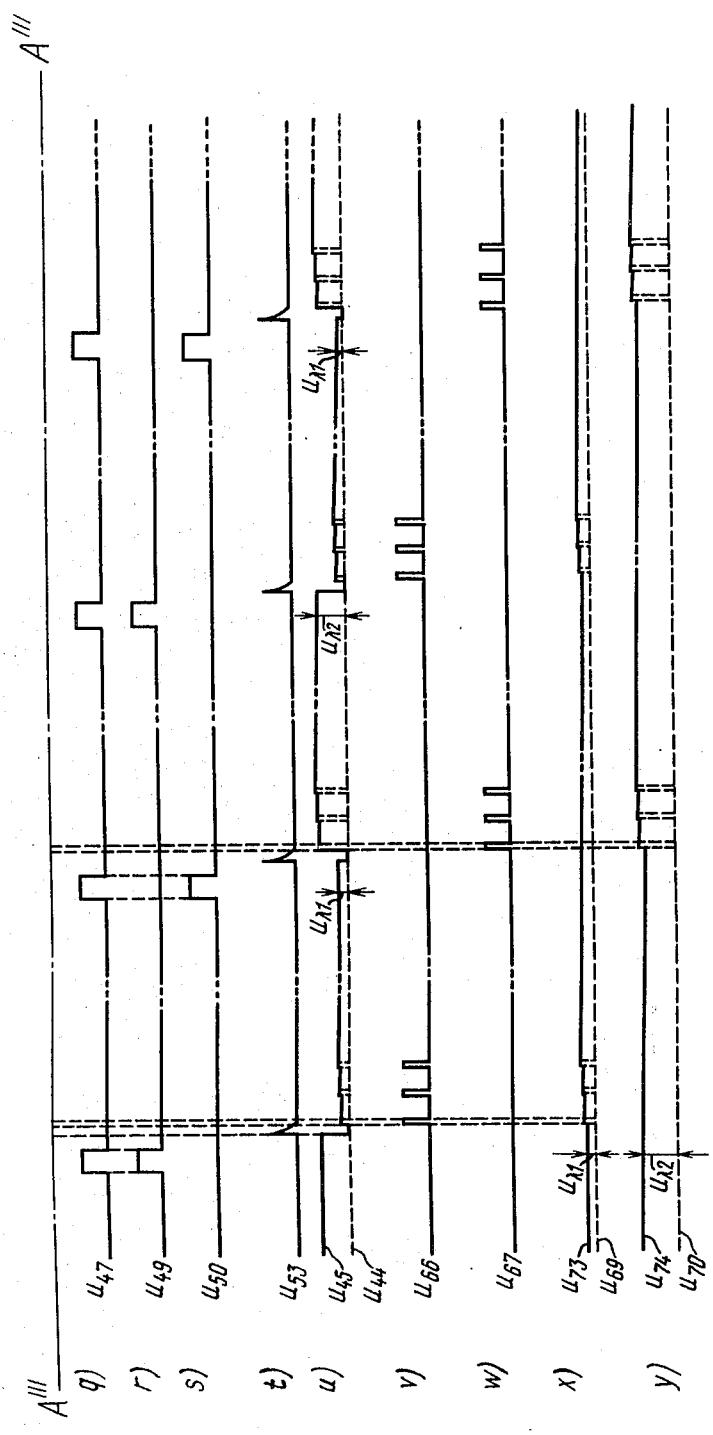

The signal $U_{30}$ (FIG. 13, $f$) at the output of the coincidence circuit 30, the two inputs thereof being driven by the signals $U_{28}$ (FIG. 13, $d$) and $U_{29}$ (FIG. 13, $e$), should ideally correspond, in duration, to the signal $U_5{}^{III}$ (FIG. 13, $c$). But since the frame 15 (FIGS. 2, 3) of the carrier for the optical filters 16, 17 exhibits a finite displacement speed when acted upon by the electromagnets 20, 21, the signal $U'_{30}$ (FIG. 13, $f$) differs from the signal $U_5{}^{III}$ (FIG. 13, $c$) as a result of distortion of the signals $U_{28}$ (FIG. 13, $d$) and $U_{29}$ (FIG. 13, $e$). (These distorted signals $U'_{28}$ and $U'_{29}$ are shown in FIGS. 13$d$ and 13$e$ as dashed lines).

For a logical "modulo-2" addition of the signal $U_5{}^{III}$ (FIG. 13, $c$) and the distorted singal $U'_{30}$ (FIG. 13, $f$ shown as a dashed line), i.e.; if a logical "EXCLUSIVE OR" operation is performed followed by integrating the resulting signal $U'_3$ (FIG. 13, $g$) (shown as a dashed line), a dc voltage signal $U_{31}$ is obtained which varies according to the speed of displacing the frame 15 (FIG. 2) of the carrier 12 for the optical filters 16, 17.

The "EXCLUSIVE OR" and "Integration" operations are performed by the phase detector 31 (FIG. 3), the output $U_{31}$ (FIG. 13, $g$) thereof controlling the operation of the variable power source 32 (FIG. 3).

The more the difference between the pulses $U_5{}^{III}$ (FIG. 13, $c$) and $U'_{30}$ (FIG. 13, $f$), i.e. the less the speed of displacement of the frame 15 (FIG. 2), the higher are the signal $U_{31}$ (FIG. 13, $g$), the output voltage of the power source 32 (FIG. 3) and the trigger pulse amplitude $U_{32}$ (FIGS. 13, $h$, $i$).

Thus the process of displacing the frame 15 (FIGS. 2, 3) is phase stabilized, resulting in a stable optical switching of the spectral components of the thermal radiation flux 2 from the object 3 under investigation in good synchronism with the field or frame frequency.

It may be advisable to specify operating conditions of the switchable arrangement 4 such that the switching rate of the spectral components of the radiation flux 2 from the object 3 does not coincide with the frame scanning frequency of the television camera 5, but is a multiple thereof, i.e. the optical switching is carried out at intervals of an integral number of frames. It may prove necessary, if some difficulty arises in providing high-speed optomechanical displacement of the frame 15 (FIG. 3) of the carrier 12 for the optical filters 16, 17. In this case the operation of the controlling means 13 and the means 14 for tracking the displacement speed of the frame 15 will be similar to that mentioned above, except that the frequency of the pulses $U_{30}$ (FIG. 13, $f$) will not be now equal to the frame scanning pulse frequency.

The selection of a point on the thermovision image of the object 3 (FIG. 1) at which the temperature of the object 3 is measured is made by the means 7 for generating the gating marker 103 (FIG. 10) under control of line synchronizing pulses $U_5^{II}$ (FIG. 13, $b$) and frame synchronizing pulses $U_5^{III}$ (FIG. 13, $c$) delivered from the synchronizing output of the television camera 5 (FIG. 1). The line synchronizing pulses $U_5^{II}$ (FIG. 13, $b$) applied to the input of the pulse generator 34 (FIG. 4) ensure its synchronous operation. Groups of pulses $U_{34}$ (FIG. 13, $j$) are generated at the output of the generator 34, the initial digits of each pulse sequence being always identical. The line synchronizing pulses $U_5^{II}$ (FIG. 13, $b$) interrupt the oscillations of the generator 34 (FIG. 4). The signal $U_{34}$ (FIG. 13, $j$) is a horizontal scanning function signal implying that quite a definite horizontal position on the TV raster corresponds to each pulse within the signal $U_{34}$ (FIG. 13, $j$). The vertical scanning function signal is formed by the line synchronizing pulses $U_5^{II}$ (FIG. 13, $b$) themselves, since a particular number of the line occupying a definite vertical position on the TV raster is assigned to a particular line synchronizing pulse $U_5^{II}$ (FIG. 13, $b$). The horizontal and vertical scanning function signals $U_{34}$ (FIG. 13, $j$) and $U_5^{II}$ (FIG. 13, $b$) are applied to the count inputs of the horizontal and vertical scanning counters 35 and 40 (FIG. 4), the code signals from the binary outputs thereof being applied to the first inputs of the comparison circuits 38 and 41, respectively. The input of the means 36 for selecting the position of the gating marker 103 (FIG. 10) on the TV raster is simultaneously driven by the frame synchronizing pulses $U_5^{III}$ (FIG. 13, $c$) which are applied, through the means 36 (FIG. 4) to the count inputs of the horizontal and vertical coordinate counters 37 and 39 to generate at the outputs thereof a digital code of the number of the frame synchronizing pulses $U_5^{III}$ (FIG. 13, $c$) counted, which defines the position of the gating marker 103 (FIG. 10) generated on the TV raster. The code outputs of the counters 37, 39 (FIG. 4) bearing information on the coordinates of the marker 103 (FIG. 10) arrive at the second inputs of the binary code comparison circuits 38 and 41 (FIG. 4). Vertical and horizontal bar signals $U_{38}$ (FIG. 13, $k$) and $U_{41}$ (FIG. 13, $l$) are generated at the outputs of the comparison circuits 38 and 41, their crossing point defining the position of the gating marker 103 (FIG. 10) on the TV raster.

The signals $U_{38}$ (FIG. 13, $k$) and $U_{41}$ (FIG. 13, $l$) are applied to the input of the coincidence circuit 42 (FIG. 4) generating at its output the signal $U_{42}$ (FIG. 13, $m$) to drive the first information input of the television monitor 6 (FIG. 4) and to generate the image of the gating marker 103 (FIG. 10) on the screen thereof.

The keyboard assembly forming part of the means 36 (FIG. 4) for selecting the position of the gating marker 103 (FIG. 10) on the TV raster can serve to move the marker 103 along the vertical and horizontal coordinate axes to any point on the television image of the object 3 (FIG. 4). It can be done both manually and automatically, in the latter case presetting on the keyboard the mode of automatically scanning either the entire television raster or a particular part thereof, using the marker 103 (FIG. 10).

The signal $U_{42}$ (FIG. 13 $m$) also controls the operation of the means 8 (FIG. 4) for sampling and measuring the video amplitude. For this purpose, it is applied to the control input of the electronic switch 44, the signal input thereof being driven, through the matching amplifier 43, by the video signal $U_5^I$ (FIG. 13, $a$) from the output of the television camera 5 (FIG. 4). The matching amplifier 43 serves to prevent the operation of the electronic switch 44 from influencing the waveform of the video signal $U_5^I$ (FIG. 13, $a$). Short video pulses $U_{44}$ (FIG. 13, $n$) are passed to the output of the switch 44 (FIG. 4), their duration corresponding to that of the pulses $U_{42}$ (FIG. 13, $m$) of the gating marker 103 and their amplitude corresponding to the amplitude of the video signal $U_5^I$ (FIG. 13, $a$) at those points of the TV raster gated by these pulses. The video pulses $U_{44}$ (FIG. 13, $n$) are integrated by the peak detector 45 (FIG. 4) to generate a dc voltage signal $U'_{45}$ (FIG. 13, $n$), its value being indicative of their amplitude. The voltage follower 46 (FIG. 4) acts as a buffer stage causing the discharge current of the output capacitor of the peak detector 45 to be reduced owing to its high input impedance. (Any other analog memory unit may be used in place of the follower 46). The analog-to-digital converter 47 is used to digitalize the analog signal $U_{46} = U'_{45}$ (FIG. 13, $n$).

After sampling the video signal of a particular point on the television image and measuring its amplitude, it is necessary to discriminate the video amplitudes corresponding to different spectral components of the radiation flux being sighted and to apply them to the computer 10 (FIG. 4) for calculation of their ratio. It is accomplished by the information signal switching means 9, its control input being driven by the signals $U_{30}$ (FIG. 13, $f$) supplied from the output of the coincidence circuit 30 (FIG. 1).

Each pulse $U_{30}$ (FIG. 13, $f$) arriving at the output of the flip-flop 48 of the switching means 9 is indicative of alternate switch-over of the optical filters 16, 17 (FIGS. 2, 3) passing the thermal flux 2 (FIG. 1).

At this time, signals $U_{48}^I$ (FIG. 13, $o$) and $U_{48}^{II}$ (FIG. 13, $p$) appear at the first and second outputs of the flip-flop 48 their duration being indicative of the time the thermal flux (FIG. 9) of a single spectral composition is being sighted. These signals alternately enable the logical coincidence circuits 49 and 50 (FIG. 4) for passing the gating signal $U_{47}$ (FIG. 13, $q$) from the output of the analog-to-digital converter 47 (FIG. 4) to the outputs of the coincidence circuits 49 and 50. The signals $U_{49}$ (FIG. 13, $r$) or $U_{50}$ (FIG. 13, $s$) are applied from the output of the coincidence circuits 49, 50 to the control inputs of the memory units 51, 52 (FIG. 4), the information inputs thereof being driven by the information output of the analog-to-digital converter 47.

As the signals $U_{49}$ (FIG. 13, $r$) and $U_{50}$ (FIG. 13, $s$) arrive at the control inputs of the memory units 51 and 52 (FIG. 4), these units rewrite the digital information supplied to their information input from the information output of the analog-to-digital converter 47, which information is indicative of the amplitudes of the video signals for the respective spectral components of the thermal flux 2 from the object 3.

In order to prevent the video amplitude measurement results from being influenced by the varying spectral sensitivity of the camera tube 25 (FIG. 3) of the television camera 5 (FIG. 4) for selected spectral regions, and by the variation in spectral brightness of the object 3 under investigation, it is expedient, immediately before each successive integration of the signal $U_{44}$ (FIG. 13, $n$), to discharge the capacitor of the peak detector 45

(FIG. 4) where information on the amplitude of the video signal of the preceding frame is stored (or, in other words, information on the density of the radiation flux of the preceding spectral composition). This discharge is made by the leading edge of the pulse $U_{41}$ (FIG. 13, *l*) supplied from the output of the binary code comparison circuit 41 (FIG. 4) of the means 7 for generating the gating marker. To this end, the pulse $U_{41}$ (FIG. 13, *l*) is applied to the input of the differentiating stage 53 (FIG. 4) to generate a short pulse $U_{53}$ (FIG. 13, *t*) at the output thereof which operates the electronic switch 54 (FIG. 4), grounding thereby the output of the peak detector 45, i.e. applying the signal $U_{45}$ (FIG. 13, *u*) to ground. This preliminary resetting in the means 8 (FIG. 4) for sampling and measuring the video amplitudes makes it possible to generate the signal $U_{45}=U_{46}$ (FIG. 13, *u*), which is indicative of the amplitudes of the video pulses $U_{\lambda 1}$ and $U_{\lambda 2}$ of the respective spectral components of the thermal flux 2, the measurement accuracy of these amplitudes not depending on the spectral sensitivity of the camera tube 25 (FIG. 3) and on the spectral brightness of the object 3 (FIG. 4) under investigation, i.e. the accuracy is not dependent on the amplitude ratio ($U_{\lambda 1}$ greater than $U_{\lambda 2}$ or $U_{\lambda 1}$ smaller than $U_{\lambda 2}$).

The computer 10 (FIG. 4) receiving at its input the information on the spectral components of the radiation flux 2 from the object 3 calculates the ratio of the input signals to obtain, from this calculation result, the colour, or true, temperature of the object 3 under investigation at a selected point on its surface.

The character generator 11 causes the information on the temperature derived from the computer 10 to be directly displayed on the screen of the television monitor 6.

In order to avoid the video amplitude measurement error due to instability of the reference level of this amplitude, a video signal clamping circuit 59 (FIGS. 5, 6) is provided in the thermovision pyrometer, and in order that this clamping be made to the video signal supplied, for example, from the means 55 for generating the reference radiation flux, a second measurement channel is provided comprising the unit 56 for generating the gating marker for the video signal proportional to the density of the radiation flux from the reference radiation means 55, the means 57 for sampling and measuring the video amplitude of the signal proportional to the density of the radiation flux from the reference radiation means 55, and the logarithmic division unit 58.

The operation of these units will now be discussed.

In order to generate the second gating marker 110 (FIG. 10) on the TV raster, the signals from the outputs of the counters 35 (FIG. 6) and 40 are applied simultaneously to the inputs of the respective comparison circuits 38 and 41 and to the inputs of the respective comparison circuits 62 and 64. The outputs of the comparison circuits 62 and 64 drive the coincidence circuit 65 to generate a signal applied to the information input of the television monitor 6, resulting in an image of the gating marker 110 (FIG. 10) on the screen thereof.

The unit 60 (FIG. 6) for selecting the position of the gating marker 110 (FIG. 10) enables the marker 110 to be positioned on the image 109 of the reference radiation generating means 55 (FIG. 6).

The output of the coincidence circuit 65 also controls the operation of the video amplitude sampling and measuring means 57. For this purpose, the output of the coincidence circuit 65 is applied to the first inputs of the coincidence circuits 66 and 67, the second input of the coincidence circuit 66 being driven by the signal $U_{48}{}^{I}$ (FIG. 13, *o*) from the first output of the flip-flop 48 (FIGS. 4, 6), and the second input of the coincidence circuit 67 (FIG. 6), being driven by the signal $U_{48}{}^{II}$ (FIG. 13, *p*) from the second output of the flip-flop 48 (FIG. 6).

At the output of the coincidence circuit 66 is generated a signal $U_{66}$ (FIG. 13, *v*) of the gating marker 110 (FIG. 10) for one spectral component of the reference radiation flux, and at the output of the coincidence circuit 67 a signal $U_{67}$ (FIG. 13, *w*) of the gating marker 110 (FIG. 10) for a second spectral component of the reference radiation flux. These signals separately control each their own particular channels for sampling and measuring the video amplitude, a signal $U_{69}$ (FIG. 13, *x*) being generated at the output of the electronic switch 69, a signal $U_{70}$ (FIG. 13, *y*) being generated at the output of the electronic switch 70, a signal $U_{73}$ (FIG. 13, *x*) corresponding to the measured amplitude of the video signal for the first spectral component of the radiation flux /$U_{\lambda 1}$/ being generated at the output of the voltage follower 73 (FIG. 6), and a signal $U_{74}$ (FIG. 13, *y*) corresponding to the measured amplitude of the video signal for the second spectral component of the radiation flux /$U_{\lambda 2}$/ being generated at the output of the voltage follower 74 (FIG. 6). The logarithmic division unit 58 based on the principle of preliminary calculation (measurement or conversion) of the logarithm of the input signals followed by the measurement of their difference, determines the logarithm of the ratio of the spectral components of the video signal proportional to the density of the radiation flux from the means 55 for generating the reference radiation flux. This resultant signal depends only on the temperature of the means 55 for generating the reference radiation flux, but does not depend on its emissivity, allowing a high accuracy of maintaining the particular reference level of the video signal by means of the video signal clamping circuit 59, the signal being applied to the control input thereof (even if the means 55 is not a black body).

In order that the temperature of the object 3 under investigation (FIG. 1) be monitored at several other points, and also for direct measurement of the temperature difference at any two selected points on the surface of the object 3, a means 78 (FIG. 7) for generating the gating marker 108 (FIG. 10) and a means 79 (FIG. 7) for sampling and measuring the video amplitude are further included into the circuit of the thermovision pyrometer. The operation of the gating marker generating means 78 is identical to that of the gating marker generating means 7, while the operation of the video amplitude sampling and measuring means 79 is identical to that of the video amplitude sampling and measuring means 8. In this case an image of the additional marker 108 (FIG. 10) is generated on the screen of the television monitor 6 and a numerical value of the absolute temperature difference between the points monitored by the gating markers 103 and 108 is indicated in the information register 107.

For thermal control of the object 3 (FIG. 1) under investigation, in the thermovision pyrometer are provided a means 80 (FIG. 8) for generating the gating marker 108 (FIG. 10), a means 81 (FIG. 8) for sampling and measuring the video amplitude, a switching unit 88, first and second multiplication units 83 and 84, a comparison circuit 85 and an object temperature control means 86.

An example of the process is temperature control of hot rolled sheet material. The radiation flux emitted by the hot sheet 3 is displayed by the thermovision pyrometer using optical elements such as a mirror 90. Two gating markers 103 and 108 (FIG. 10) are employed for selecting two points on the surface of the sheet 3 (FIG. 8) where the temperatures are to be equalized. The thermovision pyrometer acts to generate a signal for the object temperature control means 86 which causes the power fed to the respective radiators 87 to be redistributed, resulting in equalization of the temperature profile of the sheet 3.

The operation of the gating marker generating means 80 and the video amplitude sampling and measuring means 81 is essentially identical to the operation of the gating marker generating means 56 (FIG. 6) and the video amplitude sampling and measuring means 57. At the first output of the means 81 (FIG. 8) for sampling and measuring the video amplitude is generated a voltage $U_{73}$ (FIG. 13, $x$) of a value proportional to the spectral density of one of the components of the radiation flux from the object (e.g. of a shorter wavelength $\lambda_1$) $U_{\lambda 1}$ (FIG. 13, $x$) for the point on the surface of the object selected by means of the additional gating marker 108 (FIG. 10). At the second output of the means 81 (FIG. 8) for sampling and measuring the video amplitude is generated a voltage $U_{74}$ (FIG. 13, $y$) of a value proportional to the spectral density of another spectral component of the radiation flux from the object (of a greater wavelength $\lambda_2$) $U_{\lambda 2}$ (FIG. 13, $y$) for the same point selected by means of the additional gating marker 108 (FIG. 10).

The operation of the switching unit 82 (FIG. 8) is fully controlled by the electronic switches 91, 92, a signal $U_{45}$ (FIG. 13, $u$) from the first output of the video amplitude sampling and measuring means 8 (FIG. 8) being applied to the signal inputs thereof. This signal is alternately stored in the integrators 93 and 94 so that at their outputs are generated a signal $U_{93}$ proportional to the spectral density of the first spectral component of the radiation flux from the object (of a shorter wavelength $\lambda_1$) $U_{\lambda 1}$ (FIG. 13, $u$) for the point on the surface of the object selected by means of the main gating marker 103 (FIG. 10), and a signal $U_{94}$ proportional to the spectral density of another spectral component of the radiation flux from the object 3 (of a greater wavelength $\lambda_2$), $U_{\lambda 2}$ (FIG. 13, $u$) for the same point on the surface of the object defined by the position of the main gating marker 103 (FIG. 10) on the thermovision image of the object. The signal $U_{93}$ ($U_{\lambda 1}$) is derived from the second output of the switching unit 82 (FIG. 8), and the signal $U_{94}$ ($U_{\lambda 2}$) is derived from the first input of the switching unit 82.

Thus, at the output of the multiplication unit 83 is generated a signal $U_{83}$ proportional to the product of the signals $U_{73}$ ($U_{\lambda 1}$) and $U_{94}$ ($U_{\lambda 2}$) indicative of the densities of two different, in wavelength, spectral components of the radiation flux from the object for different points on its surface (for the point indicated by the marker 108 (FIG. 10) and for the point indicated by the marker 103). At the output of the multiplication unit 84 (FIG. 8) is generated a signal $U_{84}$ proportional to the product of the signals $U_{93}$ ($U_{\lambda 1}$) and $U_{74}$ ($U_{\lambda 2}$) also indicative of the densities of two other spectral components of the radiation flux from the object for different points on its surface.

Since the equality of the colour temperatures at two different points on the surface of the object under investigation will be given by the equality of two ratios of the respective signals $$(U_{73}/U_{\lambda 1}/)/(U_{74}/U_{\lambda 2}/) = (U_{93}/U_{\lambda 1}/)/(U_{94}/U_{\lambda 2}/)$$

the equality of these temperatures will hold also for the condition of equal products of the respective signals:

$$U_{73}/U_{\lambda 1}/ \times U_{94}/U_{\lambda 2}/ = U_{93}/U_{\lambda 1}/ \times U_{74}/U_{\lambda 2}/$$

which come to be generated at the outputs of the multiplication unit 83 and the multiplication unit 84, respectively.

The comparison of the signals $U_{83}$ and $U_{84}$ is performed by the comparison circuit 85, the output signal thereof controlling the operation of the means 86 for controlling the temperature of the object 3 under investigation.

FIG. 9 shows a block diagram of the thermovision pyrometer which, in addition to measuring the temperature at a particular selected point of the object 3 under investigation, permits generation of "temperature" images of the object 3 allowing for variation in emissivity of its surface and variation in sensitivity over the target 24 (FIG. 2) of the camera tube 25 (FIG. 3) of the television camera 5 (FIG. 9). Its operation is based on generating a "relative" video signal for two spectral components of the radiation flux 2 from the object 3. The method of generating this "relative" video signal consists in delaying the video signal bearing information on the distribution of the spectral density of radiation from the object 3 of one spectral composition, to obtain the spectral ratio on arrival of the video signal bearing information on the distribution of the spectral density of radiation of another spectral composition. The video signal $U_5$ (FIG. 13, $a$) from the output of the television camera 5 (FIG. 9) is applied therefor to the input of the video signal switching device 95. The signal $U_{48}{}^I$ (FIG. 13, $o$) and the signal $U_{48}{}^{II}$ (FIG. 13, $p$) from the outputs of the flip-flop 48 (FIG. 6) are simultaneously applied to the first and second control inputs, respectively, of the switching means 9.

At the first and second outputs of the video signal switching device 95 (FIG. 9) are generated the video signals of those television frames corresponding to sighting the flux of the respective spectral composition from the object 3. The video signal of the first television frame is written in the store 96 through the then conducting channel of the switching device 95 "output of the TV camera 5—input of store 96". This channel is gated by the pulse $U_{48}{}^I$ (FIG. 13, $o$) applied to the first control input of the switching device 95 (FIG. 9). The same signal is used for selecting the 'write' operational mode of the storage device 96 (the signal $U_{48}{}^I$/FIG. 13, $o$/ is applied to its first control input). After completing the action of the pulse $U_{48}{}^I$ (FIG. 13, $o$) and on starting the action of the pulse $U_{48}{}^{II}$ (FIG. 13, $p$), a channel "output of the TV camera 5—first input of the division unit 97" is enabled in the switching device 95 (FIG. 9). Simultaneously, the pulse $U_{48}{}^{II}$ (FIG. 13, $p$) applied to the second input of the store 96 (FIG. 9) selects the "read" operational mode for reading the information from the store 96. As a result, video signals of two adjacent frames (fields) corresponding to two different spectral components of the radiation flux 2 from the object 3 simultaneously arrive at the two inputs of the division unit 97. The ratio of these signals will correspond to the "relative" video signal delivered by the output of the division unit 97 and applied, through the then conducting channel of the switching unit 99, to the input of the television monitor 6 (the channel is enabled by the pulse $U_{48}^{II}$ (FIG. 13, p) arriving at its second control input). At the same time the "relative" video signal is stored in the store 98 (FIG. 9) in the 'write' operational mode provided by the pulse $U_{48}^{II}$ (FIG. 13, p) applied to its first control input. In the next television frame (or field), when a second pulse $U_{48}^{I}$ (FIG. 13, o) arrives, the operating cycle of the devices 95 and 96 (FIG. 9) is repeated, in this case there being no "relative" video signal at the output of the division unit 97, but a channel of the switching unit 99 is enabled connecting the input of the television monitor 6 to the output of the store 98 which operates, at the time, in the "read" mode provided by the pulse $U_{48}^{I}$ (FIG. 13, o) applied to its second control input. The write-read operation of the stores 96 and 98 (FIG. 9) is controlled in synchronism with the line and frame frequency of the television camera 5. To this end, the line synchronizing pulses $U_5^{II}$ (FIG. 13, b) and frame synchronizing pulses $U_5^{III}$ (FIG. 13, c) are applied to the third control input of the stores 96 and 98 from the synchronizing output of the television camera 5. The same synchronizing pulses $U_5^{II}$ (FIG. 13, b) and $U_5^{III}$ (FIG. 13, c) are applied to the third control input of the video signal switching device 99 for incorporation thereof into the "relative" output video signal to provide synchronous operation of the television monitor 6.

The thermovision pyrometer shown in FIG. 9 only permits of generation of a real-time "temperature" image provided that the switching devices 95 and 99, the stores 96 and 98, and the division unit 97 are sufficiently high-speed devices. Otherwise, the thermovision pyrometer would feature a low accuracy and poor reliability in displaying the information. For a better accuracy of generating the temperature profiles, while using relatively slow-speed devices, a comparatively slow "frame-by-frame" scanning operation may be employed using the gating marker. In this case the marker 103 (FIG. 10) scans the thermovision image of the object 3 under investigation (the entire television raster or a part thereof) at discrete intervals of two scanning frames (or fields), or else at an interval determined by the duration of the signal $U_{48}$ (FIG. 13, o, p), the temperature being measured at each discrete point and the measured value being stored in the memory of the computer 10. After the marker 103 (FIG. 10) has scanned the entire thermovision image and the computer 10 (FIG. 1) has stored the information on the temperature at every point of the object 3, this information may be displayed by the character generator 11 on the screen of the television monitor 6 as isothermal lines or areas 111 (FIG. 11) made specially distinct on the thermovision image of the object 3, or as a temperature profile plot 112 (FIG. 12) likewise directly observed against the background of the thermovision image 100 (FIG. 10) of the object 3 (FIG. 1).

The proposed thermovision pyrometer features the following essential characteristics:
Temperature range recorded, °C.: 200–2000
Admissible error due to the device for measuring the temperature of the object, °C.: ±0.5
Admissible error due to the method for measuring the object temperature in percent of the upper measurement limit: ±/1–1.5/
high-speed performance of the thermovision pyrometer, in milliseconds: 40

The thermovision pyrometer according to the present invention possesses the following advantages compared to the known devices.

The proposed thermovision pyrometer enables the temperature of the object under investigation to be monitored with a high degree of accuracy both at any selected point and over the entire surface thereof. The temperature measurement result accounts for the emissivity of the object under investigation, the absorption of the radiation in the intervening medium, variation in sensitivity over the phototarget of the camera tube of the television camera. Furthermore, the readings of the thermovision pyrometer are not dependent on the distance between the television camera and the object under investigation, nor on the parameters of the optical system, nor on the parameters of the video amplifier of the television camera. This feature allows measurement of the objects differently spaced from the television camera, any objects with different focal distances and of different light intensity without necessitating any recalibration of the thermovision pyrometer.

The proposed thermovision pyrometer further allows observation, on the screen of the television monitor, of "temperature" images of the objects under investigation providing a true picture of temperature distribution over the surface of the object, avoiding the effect of varying sensitivity of the target of the camera tube on the quality and accuracy of image generation.

The proposed thermovision pyrometer provides a high accuracy of measuring the temperature difference at any two points on the object under investigation, resulting in a highly efficient analysis of temperature variation over its surface.

In addition to direct temperature monitoring, the proposed thermovision pyrometer can be employed for thermal control ensuring a high accuracy of controlling the thermal process.

What is claimed is:

1. A thermovision pyrometer for remote measurement of the temperature of an object under investigation comprising:

an optical system for focusing the thermal radiation flux from the object under investigation;

an optical filtration switching means for alternately passing the spectral components of the thermal radiation flux from the object under investigation focused by said optical system, the components lying in at least two different regions of the spectrum, having an input and an output;

a television camera sensing the components of the thermal radiation flux for generation of a video signal proportional to the density of the thermal radiation flux from the object under investigation, having an output, a synchronizing output, said synchronizing output being connected to said input of said optical filtration switching means;

a first gating marker generating means for the video signal proportional to the density of the thermal radiation flux from the object under investigation, having an input, a first output, and a second output, said input being connected to said synchronizing output of said television camera;

a first means for sampling and measuring the amplitude of the video signal proportional to the density of the thermal radiation flux from the object under investigation, having a signal input, a control input, an information input, a first output, a second output, said signal input being connected to said output of said television camera, said control input being connected to said first output of said first means for generating the gating marker for the video signal proportional to the density of the thermal radiation flux from the object under investigation;

an information signal switching means having a first control input, a second control input, a third control input, a fourth control input, an information input, a first output, a second output, said first control input being connected to said output of said optical filtration switching means, said second control input being connected to said second output of said first gating marker pulse generating means for the video signal proportional to the density of the thermal radiation flux from the object under investigation, said third and fourth control inputs being connected to said first and second outputs, respectively, of said first means for sampling and measuring the amplitude of the video signal proportional to the density of the thermal radiation flux from the object under investigation, said information input being connected to said information output of said first means for sampling and measuring the amplitude of the video signal;

a computer having a first input, a second input, and an output, said first and second inputs being connected to said first and second outputs, respectively, of said information signal switching means;

a character generator having a synchronizing input, an input, and an output, said synchronizing input being connected to said synchronizing output of said television camera, said input being connected to said output of said computer;

a television monitor having an input, a first information input, a second information input, said input being connected to said output of said television camera, said first information input being connected to said first output, of said first gating marker generating means, said second information input being connected to said output of said character generator.

2. A thermovision pyrometer of claim 1 wherein the optical filtration switching means comprises:

a carrier for at least two optical filters;

a means for controlling the displacement of said optical filter carrier in a plane parallel to the optical input of said television camera, having an input connected to said synchronizing output of said television camera;

a means for tracking the speed of displacement of said optical filter carrier, having an output connected to said first control input of said information signal switching means.

3. A thermovision pyrometer of claim 2 wherein said carrier for optical filters comprises:

a frame provided with two tips of ferromagnetic material positioned at the opposite ends of said frame on a line parallel to the line passing through the centers of the optical filters;

a pair of electromagnets interacting with the ferromagnetic tips of said frame;

a first optoelectronic coupling designed for location of said frame of said optical filter carrier and having an output;

a second optoelectronic coupling designed for location of said frame of said optical filter carrier and having an output; the means for tracking the speed of displacement of said optical filter carrier comprises:

a first amplifier having an input and an output, said input being connected to said output of said first optoelectronic coupling;

a second amplifier having an input and an output, said input being connected to said output of said second optoelectronic coupling;

a coincidence circuit having a first input, a second input, and an output, said first input being connected to said output of said first amplifier, said second input being connected to said output of said second amplifier, said output being connected to said first control input of said information signal switching means; the means for controlling the displacement of said optical filter carrier comprises:

a phase detector having a first input, a second input, and an output, said first input being connected to said output of said coincidence circuit, said second input being connected to said synchronizing output of said television camera;

a power source having an input and an output, said input being connected to said output of said phase detector;

an electronic switch having a signal input, a control input, a first output, a second output, said signal input being connected to said output of said power source, said control input being connected to said synchronizing output of said television camera, and said first and second outputs being connected to the respective inputs of the electromagnets of said optical filter carrier.

4. A thermovision pyrometer of claim 1 wherein the information signal switching means comprises:

a flip-flop having an input, a first output, a second output, said input being connected to said output of said optical filtration switching means;

a first coincidence circuit having a first input, a second input, and an output, said first input being connected to said second output of said first means for sampling and measuring the amplitude of the video signal proportional to the density of the thermal radiation flux from the object under investigation, said second input being connected to said first output of said flip-flop;

a second coincidence circuit having a first input, a second input, and an output, said first input being connected to said second output of said first means for sampling and measuring the amplitude of the video signal proportional to the density of the thermal radiation flux from the object under investigation, said second input being connected to said second output of said flip-flop;

a first memory unit having an information input, a control unit, and an output, said information input being connected to said information output of said first means for sampling and measuring the amplitude of the video signal proportional to the density of the thermal radiation flux from the object under investigation, said control input being connected to said output of said first coincidence circuit, and said output being connected to said first input of said computer;

a second memory unit having an information input, a control input, and an output, said information input being connected to said information output of said first means for sampling and measuring the amplitude of the video signal proportional to the density of the thermal radiation flux from the object under investigation, said control input being connected to said output of said second coincidence circuit, and said output being connected to said second input of said computer;

a differentiating stage having an input and an output, said input being connected to said second output of said gating marker generating means for the video signal proportional to the density of the thermal radiation flux from the object under investigation;

an electronic switch having a control input, a signal input, and an output, said control input being connected to said output of said differentiating stage, said signal input being connected to said first output of said first means for sampling and measuring the amplitude of the video signal proportional to the density of the thermal radiation flux from the object under investigation, and the output being grounded.

5. A thermovision pyrometer of claim 1 wherein said first gating marker generating means for the video signal proportional to the density of the thermal radiation flux from the object under investigation includes a third output; said television monitor includes a third information input; said information signal switching means includes a third output and a fourth output;

said thermovision pyrometer further comprises:

a means for generating the reference radiation flux disposed within the proximity of the object under investigation;

a means for generating the gating marker for the video signal proportional to the density of the reference radiation flux having a first input, a second input, and an output, said first input being connected to said synchronizing output of said television camera, said second input being connected to said third output of said first means for generating the gating marker for the video signal proportional to the density of the thermal radiation flux from the object under investigation, and said output being connected to said third information input of said television monitor;

a means for sampling and measuring the amplitude of the video signal proportional to the density of the reference radiation flux having a first control input, a second control input, a third control input, a signal input, a first output, a second output, said first control input being connected to said output of said means for generating the gating marker for the video signal proportional to the reference radiation flux, said second and third control inputs being connected to said third and fourth outputs, respectively, of said information signal switching means;

a logarithmic division unit having a first input, a second input, and an output, said first and second inputs being connected to said first and second outputs, respectively, of said means for sampling and measuring the amplitude of the video signal proportional to the density of the reference radiation flux;

a video signal clamping circuit having a signal input, a control input, and an output, said signal input being connected to said output of said television camera, said control input being connected to said output of said logarithmic division unit, and said output being connected to said signal inputs of said first means for sampling and measuring the amplitude of the video signal proportional to the density of the thermal radiation flux from the object under investigation and of said means for sampling and measuring the amplitude of the video signal proportional to density of the reference radiation flux.

6. A thermovision pyrometer of claim 1 wherein said first means for generating the gating marker for the video signal proportional to density of the thermal radiation flux from the object under investigation includes a clock output; said information signal switching means includes a fifth control input, a sixth control input, a seventh control input, a second information input, a third output, a fourth output;

said television monitor includes a third information input;

said computer includes a third input and a fourth input;

said thermovision pyrometer further comprises:

a second means for generating the gating marker for the video signal proportional to density of the thermal radiation flux from the object under investigation having an input, a clock input, a first output, a second output, said first input being connected to said synchronizing output of said television camera, said clock input being connected to said clock output of said first means for generating the gating marker, said first output being connected to said third information input of said television monitor, said second output being connected to said fifth control input of said information signal switching means;

a second means for sampling and measuring the amplitude of the video signal proportional to density of the thermal radiation flux from the object under investigation having a control input, a signal input, an information output, a first output, a second output, said control input being connected to said first output of said second means for generating the gating marker, said signal input being connected to said output of said television camera, said first and second outputs being connected to said sixth and seventh inputs, respectively, of said information signal switching means, and said information output being connected to said second information input of said information signal switching means, said third and fourth outputs of said information signal switching means being connected to said third and fourth inputs, respectively, of said computer.

7. A thermovision pyrometer of claim 1 wherein said first means for generating the gating marker for the video signal proportional to density of the thermal radiation flux from the object under investigation includes a clock output;

said switching means for information signals includes a third output, a fourth output;

said thermovision pyrometer further comprises:

a second means for generating the gating marker for the video signal proportional to density of the thermal radiation flux from the object under investigation having an input, a clock input, an output, said input being connected to said synchronizing output of said television camera, said clock input being connected to said clock output of said first gating marker generating means;

a second means for sampling and measuring the amplitude of the video signal proportional to density of the thermal radiation flux from the object under investigation having a first control input, a second control input, a third control input, a signal input, a first output, a second output, said first control input being connected to said output of said second gating marker generating means, said second and third inputs being connected to said third and fourth outputs, respectively, of said information signal switching means, and said signal input being connected to said output of said television camera;

a switching unit having a first control input, a second control input, a signal input, a first output, a second output, said first and second control inputs being connected to said third and fourth outputs, respectively, of said information signal switching means, and said signal input being connected to said first output of said first means for sampling and measuring the video signal amplitude;

a first multiplication unit having a first input, a second input, and an output, said first input being connected to said first output of said second means for sampling and measuring the video signal amplitude, and said second input being connected to said first output of said switching unit;

a second multiplication unit having a first input, a second input, and an output, said first input being connected to said second output of said switching unit, said second input being connected to said second output of said means for sampling and measuring the video signal amplitude;

a comparison circuit having a first input, a second input, said first input being connected to said output of said first multiplication unit, said second input being connected to said output of said second multiplication unit;

a unit for controlling the temperature of the object under investigation having an output connected to said output of said comparison circuit.

8. A thermovision pyrometer for remote measurement of the temperature of the object under investigation comprising:

an optical system for focusing the thermal radiation flux from the object under investigation;

an optical filtration switching arrangement for alternately passing the spectral components of the thermal radiation from the object under investigation focused by said optical system positioned in at least two different regions of the spectrum, having an input and an output;

a television camera sensing the components of the thermal radiation flux to produce a video signal proportional to the density of the thermal radiation flux from the object under investigation having an output and a synchronizing output, said synchronizing output being connected to said input of said optical filtration switching arrangement;

a means for generating the gating marker for the video signal proportional to the density of the thermal radiation flux from the object under investigation having an input, a first output, a second output, said input being connected to said synchronizing output of said television camera;

a means for sampling and measuring the amplitude of the video signal proportional to the density of the thermal radiation flux from the object under investigation having a signal input, a control input, an information output, a first output, a second output, said signal input being connected to said output of said television camera, said control input being connected to said first output of said means for generating the gating marker for the video signal proportional to the density of the thermal radiation flux from the object under investigation;

an information signal switching means having a first control input, a second control input, a third control input, a fourth control input, an information input, a first output, a second output, a third output, a fourth output, said first control input being connected to said output of said optical filtration switching arrangement, said second control input being connected to said second output of said means for generating the gating marker for the video signal proportional to the thermal radiation flux from the object under investigation, said third and fourth control inputs being connected to said first and second outputs, respectively, of said means for sampling and measuring the amplitude of the video signal proportional to the density of the thermal radiation flux from the object under investigation, said information input being connected to said information output of said means for sampling and measuring the amplitude of the video signal proportional to the density of the thermal radiation flux from the object under investigation;

a computer having a first input, a second input, and an output, said first and second inputs being connected to said first and second outputs, respectively, of said information signal switching means;

a character generator having a synchronizing input, an input, and an output, said synchronizing input being connected to said synchronizing output of said television camera, said input being connected to said output of said computer;

a first video signal switching device having a signal input, a first control input, a second control input, a first output, a second output, said signal input being connected to said output of said television camera, said first and second control inputs being connected to said third and fourth outputs of said information signal switching means;

a first store having a signal input, a first control input, a second control input, a third control input, and an output, said signal input being connected to said first output of said first video signal switching device, said first and second control inputs being connected to said third and fourth outputs, respectively, of said information signal switching means, said third control input being connected to said synchronizing output of said television camera;

a division unit having a first input, a second input, and an output, said first input being connected to said second output of said first video signal switching device, said second input being connected to said output of said first store;

a second store having a signal input, a first control input, a second control input, a third control input, said signal input being connected to said output of said division unit, said first and second control inputs being connected to said fourth and third outputs, respectively, of said information signal switching means, and said third control input being connected to said synchronizing output of said television camera;

a second video signal switching device having a first signal input, a second signal input, a third signal input, and an output, said first signal input being connected to said output of said division unit, said second signal input being connected to said output of said second store, said first and second control inputs being connected to said third and fourth outputs, respectively, of said information signal switching means, said third control input being connected to said synchronizing output of said television camera;

a television monitor having an input, a first information input, a second information input, said input being connected to said output of said second video signal switching device, said first information input being connected to said first output of said means for generating the gating marker for the video signal proportional to the density of the thermal radiation flux from the object under investigation, and said second information input being connected to said output of said character generator.

* * * * *